(12) United States Patent
Shinada

(10) Patent No.: US 9,357,477 B2
(45) Date of Patent: May 31, 2016

(54) CONTROL APPARATUS AND METHOD OF CONTROLLING CELL SEARCH

(71) Applicant: FUJITSU LIMITED, Kawasaki-shi, Kanagawa (JP)

(72) Inventor: Yuki Shinada, Saitama (JP)

(73) Assignee: FUJITSU LIMITED, Kawasaki (JP)

( * ) Notice: Subject to any disclaimer, the term of this patent is extended or adjusted under 35 U.S.C. 154(b) by 62 days.

(21) Appl. No.: 14/254,956

(22) Filed: Apr. 17, 2014

(65) Prior Publication Data

US 2014/0349642 A1 Nov. 27, 2014

(30) Foreign Application Priority Data

May 24, 2013 (JP) ................ 2013-110379

(51) Int. Cl.
*H04W 48/16* (2009.01)
*H04W 52/02* (2009.01)

(52) U.S. Cl.
CPC .......... *H04W 48/16* (2013.01); *H04W 52/0212* (2013.01); *Y02B 60/50* (2013.01)

(58) Field of Classification Search
CPC ............ H04W 48/16; H04W 52/0212; H04W 84/045
USPC ................................. 455/434, 444
See application file for complete search history.

(56) References Cited

U.S. PATENT DOCUMENTS

| | | | | |
|---|---|---|---|---|
| 2004/0058717 A1* | 3/2004 | McDonnell | ........... | H04W 48/16 455/567 |
| 2009/0005031 A1* | 1/2009 | Van Lieshout | ........ | H04W 36/32 455/425 |
| 2011/0306340 A1* | 12/2011 | Lindoff | ................ | H04W 48/16 455/434 |
| 2012/0252463 A1* | 10/2012 | Zou | ........................ | G01S 5/021 455/441 |
| 2013/0040640 A1* | 2/2013 | Chen | ..................... | H04W 36/30 455/434 |
| 2014/0213283 A1* | 7/2014 | Gillett | .................. | G01S 5/0072 455/456.1 |

FOREIGN PATENT DOCUMENTS

| | | |
|---|---|---|
| JP | 2000-253095 | 9/2000 |
| JP | 2010-170469 | 8/2010 |

OTHER PUBLICATIONS

Source: Huawei, HiSilicon, CATR; 3GPP TSG-RAN Meeting #58, RP-122032, "New Study Item Proposal for Small Cell Enhancements for E-UTRA and E-UTRAN—Physical-layer Aspects", Dec. 4-7, 2012.
Source: NTT DOCOMO, Inc. 3GPP TSG-RAN Meeting #58, RP-122033, "New Study Item Description: Small Cell Enhancements for E-UTRA and E-UTRAN—Higher-layer Aspects", Dec. 4-7, 2012.

\* cited by examiner

*Primary Examiner* — George Eng
*Assistant Examiner* — Marcus Hammonds
(74) *Attorney, Agent, or Firm* — Fujitsu Patent Center

(57) ABSTRACT

In a control apparatus, a network IF acquires position information of a terminal that exists in both of a macro cell and a small cell, and position information of a terminal that exists in the macro cell. A control unit then identifies the terminal that exists in a peripheral area including an area corresponding to the small cell based on the position information of the terminals. The control unit then notifies the identified terminal of a control signal that starts cell search about the small cell through the macro cell.

3 Claims, 31 Drawing Sheets

| ITEM | CONTENT |
|---|---|
| SMALL CELL IDENTIFIER | aaa |
| POSITION INFORMATION | 35.730541xx/139.71294yy |
| FREQUENCY BAND | 2.2 GHz |
| CELL RADIUS | 500 m |
| GUEST USER | PERMITTED |
| USER ID (1) | |
| USER ID (2) | |
| ... | |
| USER ID (x) | |

FIG.19

| SMALL CELL IDENTIFIER | POSITION INFORMATION | FREQUENCY BAND | CELL RADIUS | GUEST USER | PERMITTED USER ID |
|---|---|---|---|---|---|
| aaa | 35.730541xx/139.71294yy | 2.2 GHz | 500 m | PERMIT | |
| bbb | 35.730547xx/139.71295yy | 2.3 GHz | 600 m | NOT PERMIT | 123456 |
| | | | | | 234567 |
| | | | | | 345678 |
| ccc | 35.730551xx/139.71296yy | 2.2 GHz | 500 m | PERMIT | |
| ddd | 35.730557xx/139.71297yy | 3.5 GHz | 700 m | NOT PERMIT | 456789 |
| | | | | | 543210 |
| | | | | | 654321 |
| eee | 35.730561xx/139.71298yy | 2.2 GHz | 500 m | PERMIT | 987654 |

| ITEM | CONTENT |
|---|---|
| TERMINAL IDENTIFIER | AAA |
| USER ID | 123456 |
| PASSWORD | xxxxxx |

| ITEM | CONTENT |
|---|---|
| TERMINAL IDENTIFIER | XXX |
| USER ID | XYZ |
| PASSWORD | xxxxxx |
| SMALL CELL ID | 000 |

FIG.26

| No. | TERMINAL IDENTIFIER | USER ID | TERMINAL TYPE |
|---|---|---|---|
| 00001 | AAA | 123456 | COMMON |
| 00002 | BBB | 789101 | COMMON |
| 00003 | CCC | 121314 | FIXED |
| 00004 | DDD | 151617 | COMMON |

FIG.28

| No. | TERMINAL IDENTIFIER | USER ID | TERMINAL TYPE | POSITION INFORMATION (LATITUDE/LONGITUDE) | UPDATE TIME |
|---|---|---|---|---|---|
| 00001 | AAA | 123456 | COMMON | 35.730541xx/139.71304yy | yyyy/mm/dd hh:mm:ss |
| 00002 | BBB | 789101 | COMMON | 35.730547xx/139.71305yy | yyyy/mm/dd hh:mm:ss |
| 00003 | CCC | 121314 | FIXED | 35.730551xx/139.71296yy | yyyy/mm/dd hh:mm:ss |
| 00004 | DDD | 151617 | COMMON | 35.730557xx/139.71307yy | yyyy/mm/dd hh:mm:ss |

FIG.30

| ITEM | CONTENT |
|---|---|
| SMALL CELL IDENTIFIER | aaa |

FIG.31

| ITEM | CONTENT |
|---|---|
| TERMINAL IDENTIFIER | AAA |
| USER ID | 123456 |
| TERMINAL TYPE | FIXED |
| SMALL CELL IDENTIFIER | aaa |
| TRANSMISSION INTERVAL | INSTANTLY |
| TRANSMISSION FREQUENCY | – |

| ITEM | CONTENT |
|---|---|
| SMALL CELL IDENTIFIER | AAA |
| FREQUENCY | 2.3 GHz |

CONTROL APPARATUS AND METHOD OF CONTROLLING CELL SEARCH

CROSS-REFERENCE TO RELATED APPLICATION(S)

This application is based upon and claims the benefit of priority of the prior Japanese Patent Application No. 2013-110379, filed on May 24, 2013, the entire contents of which are incorporated herein by reference.

FIELD

The embodiments discussed herein are related to a control apparatus, a terminal apparatus, and a method of controlling cell search.

BACKGROUND

Conventionally, various ideas have been devised in order to increase a transmission capacity (hereinafter, may be referred to as "system capacity") in a communication system. For example, in the 3rd generation partnership project long term evolution (3GPP LTE), discussions related to a technology to increase the system capacity using a "small cell" in addition to a "macro cell" have been held. Here, a "cell" is defined based on a "communication area" and a "channel frequency" of one base station apparatus (hereinafter, may be simply referred to as "base station"). The "communication area" may be the whole of an area where a radio wave transmitted from the base station reaches (hereinafter, may be referred to as "coverage area), or may be a divided area obtained by division of the coverage area (so-called, sector). The "channel frequency" is a unit of a frequency used by the base station for communication, and is defined based on a center frequency and a bandwidth. Further, the channel frequency is a part of an "operating band" allocated to the system as a whole. The "macro cell" is a cell of a base station capable of performing transmission with high transmission power, that is, a cell of a base station having a large coverage area. Further, the "small cell" is a cell of a base station that performs transmission with low transmission power, that is, a cell of a base station having a small coverage area.

That is, as a configuration of the communication system, a configuration in which cells having different sizes are mixed has been discussed as illustrated in FIG. 1. For example, as a configuration of the communication system, there may be a first configuration in which a plurality of small cells is included in a macro cell, a second configuration in which a plurality of small cells is arranged irrespective of a macro cell, and the like. FIG. 1 is a diagram illustrating a configuration example of a communication system.

Further, a communication terminal apparatus (hereinafter, may be simply referred to as "terminal") performs processing of detecting a cell to be connected (that is, cell search processing) in order to start communication with a base station.

Conventional examples are described in 3GPP TSG-RAN Meeting#58, RP-122032, "New Study Item Proposal for Small Cell Enhancements for E-UTRA and E-UTRAN—Physical-layer Aspects," December 2012, 3GPP TSG-RAN Meeting#58, RP-122033, "New Study Item Description: Small Cell enhancements for E-UTRA and E-UTRAN—Higher-layer aspects," December 2012, Japanese Laid-open Patent Publication No. 2010-170469, and Japanese Laid-open Patent Publication No. 2000-253095

By the way, there is a need to extend the time for which the terminal can operate with single charging. However, there is a possibility that the power consumption of the terminal by cell search about a small cell is increased. That is, since a macro cell and a small cell basically use different frequency bands (inter-frequencies), the terminal performs the cell search processing of the macro cell and of the small cell separately. Under the circumstances where the position of the small cell is not known, there is a possibility that the cell search processing may be repeatedly executed at a position far from the small cell. In this case, the power of the terminal may be wastefully consumed.

SUMMARY

According to an aspect of an embodiment, a control apparatus includes an acquisition unit configured to acquire position information of a first terminal that exists in both of a first cell and a second cell, and position information of a second terminal that exists in the first cell; and a control unit configured to identify the second terminal that exists in a peripheral area including an area corresponding to the second cell based on the position information of the first terminal and the position information of the second terminal, and notify the identified second terminal of a control signal that starts cell search about the second cell through the first cell.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 19 is a diagram illustrating an example of a format of a small cell management DB;

FIG. 26 is a diagram illustrating an example of a format of a user management DB;

FIG. 28 is a diagram illustrating an example of the format of the user management DB;

FIG. 30 is a diagram illustrating an example of a holding form of a small cell identifier by a small cell information transmission request unit;

FIG. 31 is a diagram illustrating an example of a format of the small cell information transmission request;

DESCRIPTION OF EMBODIMENT(S)

Preferred embodiments of the present invention will be explained with reference to accompanying drawings. Note that the control apparatus, the terminal apparatus, and the method of controlling cell search disclosed in the present application are not limited by the embodiments. Further, configurations having the same function in the embodiments are denoted with the same reference sign, and overlapped description is omitted.

[a] First Embodiment

Outline of Communication System

Figure 1:
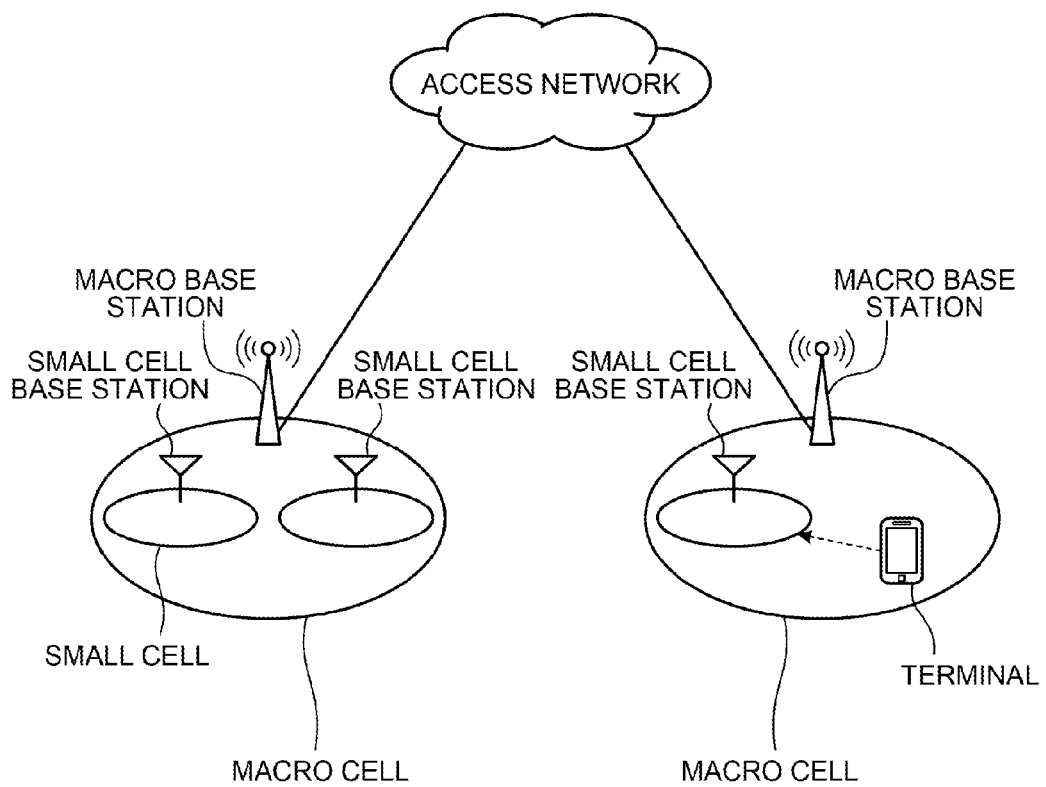
FIG. 1 is a diagram illustrating a configuration example of a communication system.
Figure 2:
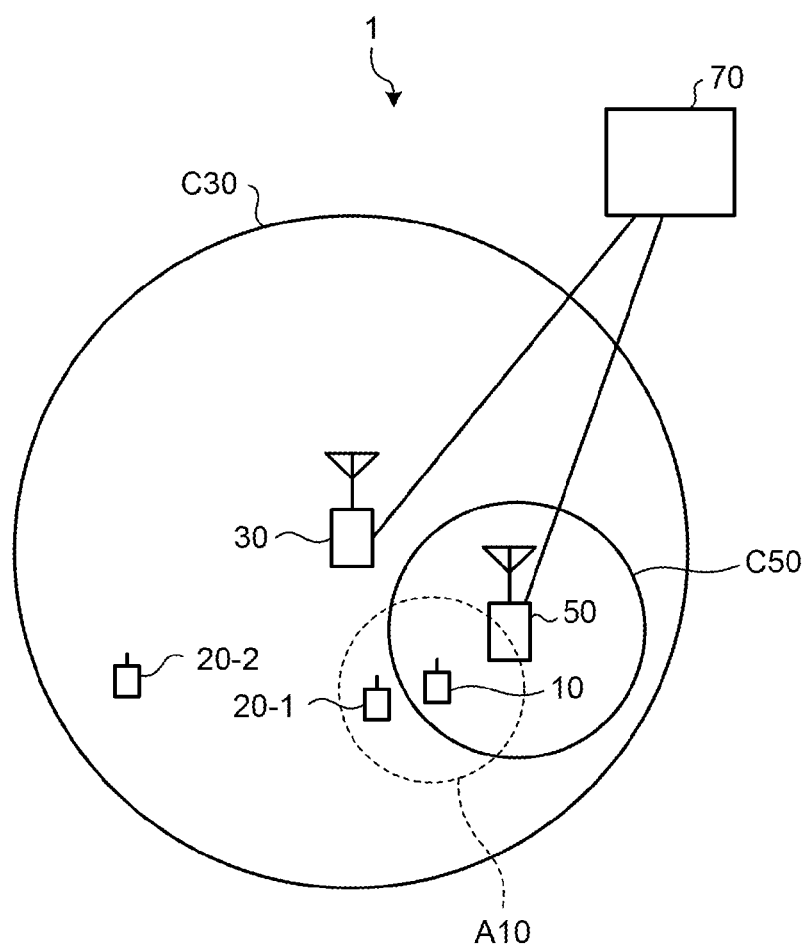
FIG. 2 is a diagram illustrating an example of a communication system of a first embodiment.

FIG. 2 is a diagram illustrating an example of a communication system of a first embodiment. In FIG. 2, a communication system 1 includes terminals 10 and 20, base stations 30 and 50, and a control apparatus 70. In FIG. 2, a macro cell C30 is defined by a coverage area of the base station 30 and a first channel frequency. Further, a small cell C50 is defined by a coverage area of the base station 50 and a second channel frequency. Further, the first channel frequency and the second channel frequency belong to different operating bands. As the operating bands, any of the 800-MHz band, 1.5-GHz band, 3.5-GHz band, 2-GHz band, and the like may be employed. Further, the terminal 10 and the terminal 20 are supposed to be connected with the base station 30 using the macro cell C30. Note that the numbers of the terminals 10 and 20, the base stations 30 and 50, and the control apparatus 70 are an example, and are not limited thereto. Further, terminals 20-1 and 20-2 in FIG. 2 have the same configuration. Hereinafter, when terminals 20-1 and 20-2 are not distinguished, they may be simply collectively called terminal 20.

In the communication system 1, when having detected a signal transmitted from the base station 50 using the small cell C50, the terminal 10 reports information indicating the terminal 10 exists in the small cell C50, and position information of the terminal 10 to the control apparatus 70 through the base station 30 of the macro cell C30.

Further, the terminal 20 reports position information of the terminal 20 to the control apparatus 70 through the base station 30 of the macro cell C30. The terminal 20 periodically sends the report, for example.

The control apparatus 70 acquires position information of the terminal 10 that exists in both of the macro cell C30 and the small cell C50 and position information of the terminal 20 that exists in the macro cell C30. The control apparatus 70 then identifies the terminal 20 that exists in a "peripheral area" including an area corresponding to the small cell C50 based on the position information of the terminal 10 and the position information of the terminal 20. In the first embodiment, for example, the control apparatus 70 estimates the peripheral area based on the position information of the terminal 10, and a value corresponding to an average width (for example, the diameter) of the small cell C50, and identifies the terminal 20 that exists in the estimated peripheral area based on the estimated peripheral area and the position information of the terminal 20. The peripheral area is, for example, an area A10 in FIG. 2. When the peripheral area is the area A10, the control apparatus 70 identifies the terminal 20-1. The peripheral area will be described in detail below.

The control apparatus 70 then notifies the identified terminal 20-1 of a control signal that starts cell search processing about the small cell C50 through the macro cell C30. Note that the control apparatus 70 may execute the processing of identifying the terminal that exists in the peripheral area and the processing of notifying the identified terminal of the control signal when there is a request from the terminal 10.

The terminal 20-1 starts the cell search about the small cell C50 when the above-described control signal is included a signal transmitted using the macro cell C30.

As described above, the control apparatus 70 can identify the terminal 20 that exists in the peripheral area including an area corresponding to the small cell C50, that is, the terminal 20 that exists in the small cell C50 or in the vicinity of the small cell C50, based on the position information of the terminal 10 and the position information of the terminal 20. Then, the control apparatus 70 can allow only the terminal 20 that exists in the small cell C50 or in the vicinity of the small cell C50 to start the cell search about the small cell C50. As a result, the terminal 20 that is far from the small cell C50 does not wastefully execute the cell search about the small cell C50. Therefore, the power consumption of the terminal 20 can be reduced.

Configuration Example of Control Apparatus

Figure 3:
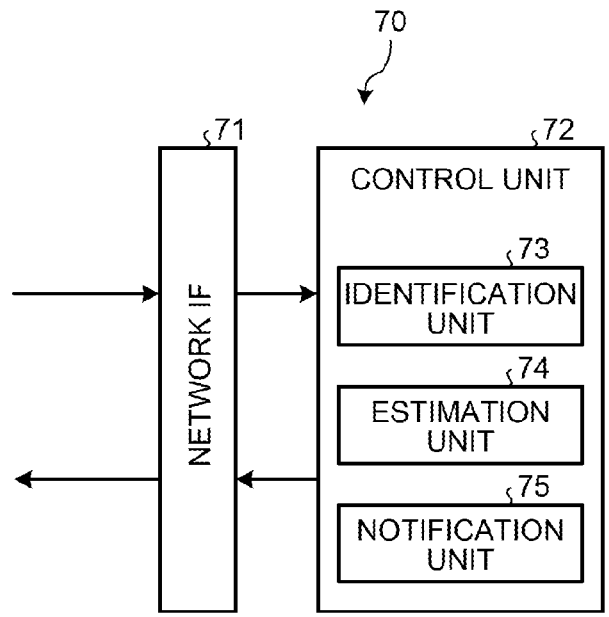
FIG. 3 is a block diagram illustrating an example of a control apparatus of the first embodiment.

FIG. 3 is a block diagram illustrating an example of a control apparatus of the first embodiment. In FIG. 3, the control apparatus 70 includes a network interface (IF) 71 and a control unit 72. The control unit 72 includes an identification unit 73, an estimation unit 74, and a notification unit 75.

The network IF 71 is a communication interface between the control apparatus 70, and the base stations 30 and 50. The network IF 71 acquires, through the base station 30, information transmitted from the terminals 10 and 20. The information is, for example, the position information of the terminal 10, the position information of the terminal 20, and a request message from the terminal 10. The control unit 72 may use the request message as a trigger to execute the processing of identifying the terminal that exists in the peripheral area, and the processing of notifying the identified terminal of the control signal.

The estimation unit 74 estimates the peripheral area based on the position information of the terminal 10 and the value corresponding to an average width (for example, the diameter) of the small cell C50.

The identification unit 73 identifies the terminal 20 that exists in the estimated peripheral area based on the peripheral area estimated in the estimation unit 74 and the position information of the terminal 20.

The notification unit 75 forms the control signal to the terminal 20 identified in the identification unit 73, and notifies the terminal 20 identified in the identification unit 73 of the formed control signal through the network IF 71 and the base station 30.

Configuration Example of First Terminal

Figure 4:
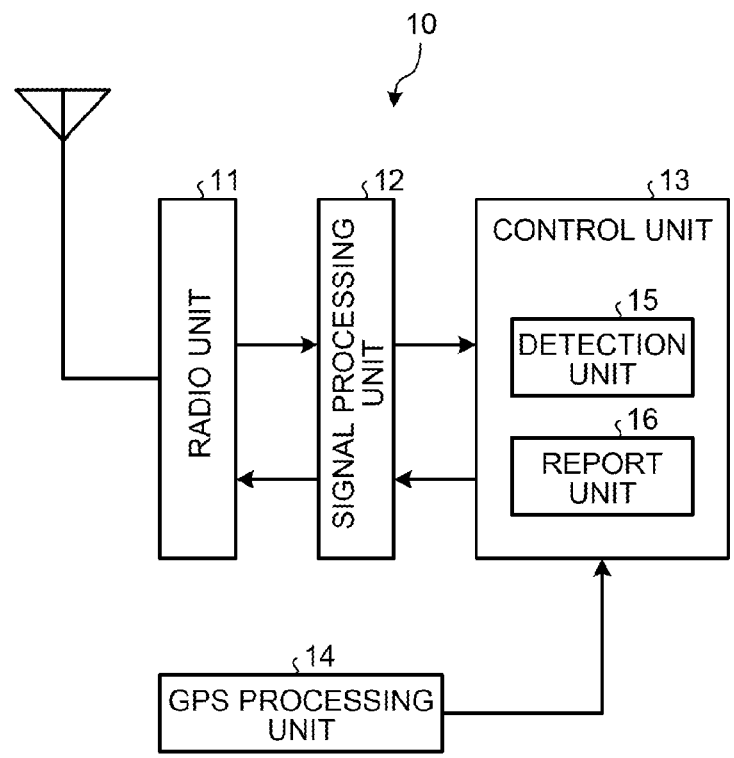
FIG. 4 is a block diagram illustrating an example of a first terminal of the first embodiment.

FIG. 4 is a block diagram illustrating an example of a first terminal of the first embodiment. In FIG. 4, the terminal 10 includes a radio unit 11, a signal processing unit 12, a control unit 13, and a global positioning system (GPS) processing unit 14. The control unit 13 includes a detection unit 15 and a report unit 16.

The radio unit 11 is a communication interface between the terminal 10, and the base stations 30 and 50. The radio unit 11 applies predetermined reception radio processing, that is, down-conversion, analog-digital conversion, and the like, to a received signal received through an antenna, and outputs the received signal after the reception radio processing to the signal processing unit 12. Further, the radio unit 11 applies predetermined transmission radio processing, that is, digital-analog conversion, up-conversion, and the like, to a transmission signal received from the signal processing unit 12 to form a radio signal, and transmits the formed radio signal through the antenna.

The signal processing unit 12 applies predetermined reception processing (that is, demodulation, decoding, and the like) to a received signal received from the radio unit 11, and outputs received data to the control unit 13. Further, the signal processing unit 12 applies predetermined transmission processing (that is, encoding, modulation, and the like) to input transmission data to form a transmission signal, and outputs the transmission signal to the radio unit 11.

The detection unit 15 detects a signal transmitted from the base station 50 using the received data received from the signal processing unit 12. For example, the detection unit 15 detects a reference signal transmitted from the base station 50.

The report unit 16 receives the position information of the terminal 10 acquired by the GPS processing unit 14. The report unit 16 then reports the information indicating the terminal 10 exists in the small cell C50, and the position information of the terminal 10 to the control apparatus 70 through the base station 30 of the macro cell C30 by outputting these pieces of information to the signal processing unit 12 when the detection unit 15 has detected a signal transmitted from the base station 50.

The GPS processing unit 14 acquires the position information of the terminal 10, and outputs the position information to the control unit 13.

Configuration Example of Second Terminal

Figure 5:
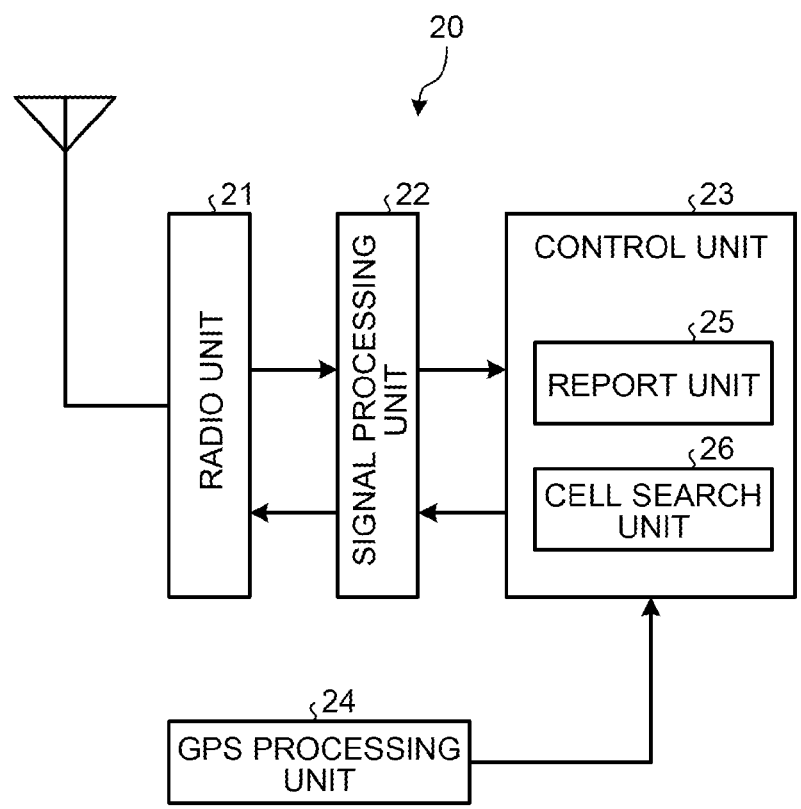
FIG. 5 is a block diagram illustrating a configuration of a second terminal of the first embodiment.

FIG. 5 is a block diagram illustrating a configuration of a second terminal of the first embodiment. In FIG. 5, the terminal 20 includes a radio unit 21, a signal processing unit 22, a control unit 23, and a GPS processing unit 24. The control unit 23 includes a report unit 25 and a cell search unit 26.

The radio unit 21 is a communication interface between the terminal 20, and the base stations 30 and 50. The radio unit 21 applies predetermined reception radio processing, that is, down-conversion, analog-digital conversion, and the like to a received signal received through an antenna, and outputs the received signal after the reception radio processing to the signal processing unit 22. Further, the radio unit 21 applies predetermined transmission radio processing, that is, digital-analog conversion, up-conversion, and the like to a transmission signal received from the signal processing unit 22 to form a radio signal, and transmits the formed radio signal through the antenna.

The signal processing unit 22 applies predetermined reception processing (that is, demodulation, decoding, and the like) to a received signal received from the radio unit 21, and outputs received data to the control unit 23. Further, the signal processing unit 22 applies predetermined transmission processing (that is, encoding, modulation, and the like) to input transmission data to form a transmission signal, and outputs the transmission signal to the radio unit 21.

The report unit 25 receives the position information of the terminal 20 acquired by the GPS processing unit 24. The report unit 25 then reports the position information of the terminal 20 to the control apparatus 70 through the base station 30 of the macro cell C30 by outputting the position information to the signal processing unit 22.

The cell search unit 26 starts the cell search about the small cell C50 when a control signal is included in a signal transmitted using the macro cell C30. The control signal is the control signal that starts the cell search processing about the small cell C50.

The GPS processing unit 24 acquires the position information of the terminal 20, and outputs the position information to the control unit 23.

Configuration Example of First Base Station

Figure 6:
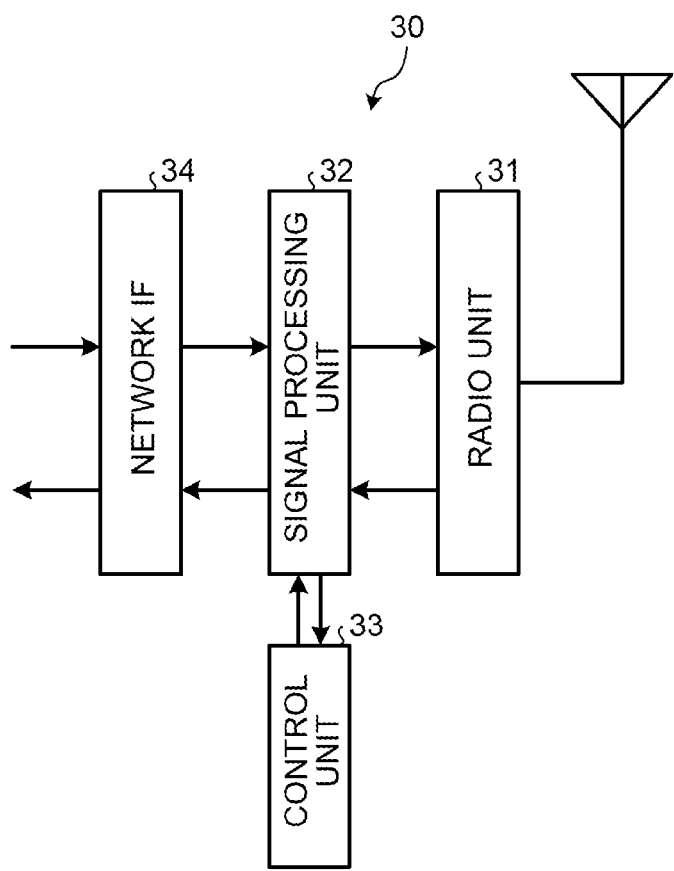
FIG. 6 is a block diagram illustrating an example of a first base station of the first embodiment.

FIG. 6 is a block diagram illustrating an example of a first base station of the first embodiment. In FIG. 6, the base station 30 includes a radio unit 31, a signal processing unit 32, a control unit 33, and a network IF 34.

The radio unit 31 is a communication interface between the base station 30, and the terminals 10 and 20. The radio unit 31 receives a signal transmitted from the terminal 10 or the terminal 20 through an antenna. The radio unit 31 then applies predetermined reception radio processing, that is, down-conversion, analog-digital conversion, and the like to the received signal, and outputs the received signal after the reception radio processing to the signal processing unit 32. Further, the radio unit 31 applies predetermined transmission radio processing, that is, digital-analog conversion, up-conversion and the like to a transmission signal received from the signal processing unit 32 to form a radio signal, and transmits the formed radio signal through the antenna.

The signal processing unit 32 applies predetermined reception processing (that is, demodulation, decoding, and the like) to the received signal received from the radio unit 31 or the network IF 34, and outputs received data to the control unit 33. Further, the signal processing unit 32 applies predetermined transmission processing (that is, encoding, modulation, and the like) to transmission data received from the control unit 33 to form a transmission signal, and outputs the transmission data to the network IF 34 or the radio unit 31.

The control unit 33 executes transfer processing of transferring a signal transmitted from the control apparatus 70 to the terminal 10 or the terminal 20, or transfer processing of transferring a signal transmitted from the terminal 10 or the terminal 20 to the control apparatus 70. Further, the control unit 33 forms a reference signal, and transmits the formed reference signal through the signal processing unit 32 and the radio unit 31. Further, the control unit 33 controls a cell search procedure between the base station 30, and the terminal 10 or the terminal 20.

The network IF 34 is a communication interface between the base station 30 and the control apparatus 70. The network IF 34 then transmits the transmission signal received from the signal processing unit 32 to the control apparatus 70. Further, the network IF 34 outputs the signal received from the control apparatus 70 to the signal processing unit 32.

Configuration Example of Second Base Station

Figure 7:
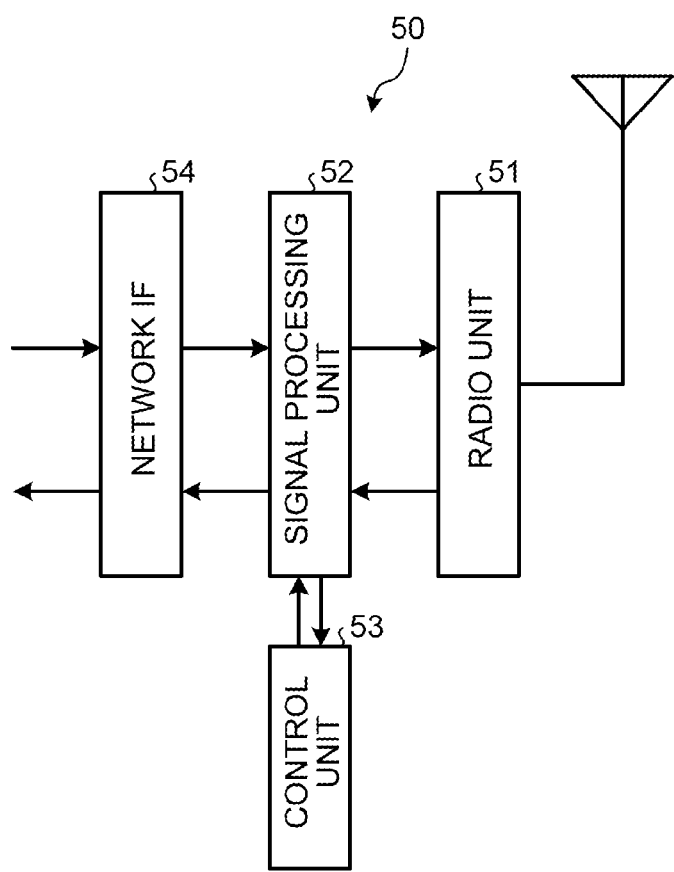
FIG. 7 is a block diagram illustrating an example of a second base station of the first embodiment.

FIG. 7 is a block diagram illustrating an example of a second base station of the first embodiment. In FIG. 7, the base station 50 includes a radio unit 51, a signal processing unit 52, a control unit 53, and a network IF 54.

The radio unit 51 is a communication interface between the base station 50, and the terminals 10 and 20. The radio unit 51 receives a signal transmitted from the terminal 10 or the terminal 20 through an antenna. The radio unit 51 then applies predetermined reception radio processing, that is, down-conversion, analog-digital conversion, and the like to the received signal, and outputs the received signal after the reception radio processing to the signal processing unit 52. Further, the radio unit 51 applies predetermined transmission radio processing, that is, digital-analog conversion, up-conversion, and the like to a transmission signal received from the signal processing unit 52 to form a radio signal, and transmits the formed radio signal through the antenna.

The signal processing unit 52 applies predetermined reception processing (that is, demodulation, decoding, and the like) to a received signal received from the radio unit 51 or the network IF 54, and outputs the received data to the control unit 53. Further, the signal processing unit 52 applies predetermined transmission processing (that is, encoding, modulation, and the like) to transmission data received from the control unit 53 to form a transmission signal, and outputs the transmission signal to the network IF 54 or the radio unit 51.

The control unit 53 executes transfer processing of transferring a signal transmitted from the control apparatus 70 to the terminal 10 or the terminal 20, or transfer processing of transferring a signal transmitted from the terminal 10 or the terminal 20 to the control apparatus 70. Further, the control unit 53 forms a reference signal, and transmits the formed reference signal through the signal processing unit 52 and the radio unit 51. Further, the control unit 53 controls a cell search procedure between the base station 50, and the terminal 10 or the terminal 20.

The network IF 54 is a communication interface between the base station 50 and the control apparatus 70. The network IF 54 then transmits the transmission signal received from the signal processing unit 52 to the control apparatus 70. Further, the network IF 54 outputs the signal received from the control apparatus 70 to the signal processing unit 52.

Operation Example of Communication System

An example of a processing operation in the communication system 1 having the above configurations will be described.

Estimation Processing of Peripheral Area

In the control apparatus 70, the estimation unit 74 estimates the peripheral area based on the position information of the terminal 10, and a value corresponding to an average width (for example, the diameter) of the small cell C50.

In the first embodiment, the control apparatus 70 is supposed not to be able to acquire the position information of the small cell C50. However, when the terminal 10 receives a signal transmitted in the small cell C50, the terminal 10 reports the position information of the terminal 10 at that point. Therefore, the control apparatus 70 can get to know that the terminal 10 exists in the small cell C50, and the position information of the terminal 10.

Figure 8:
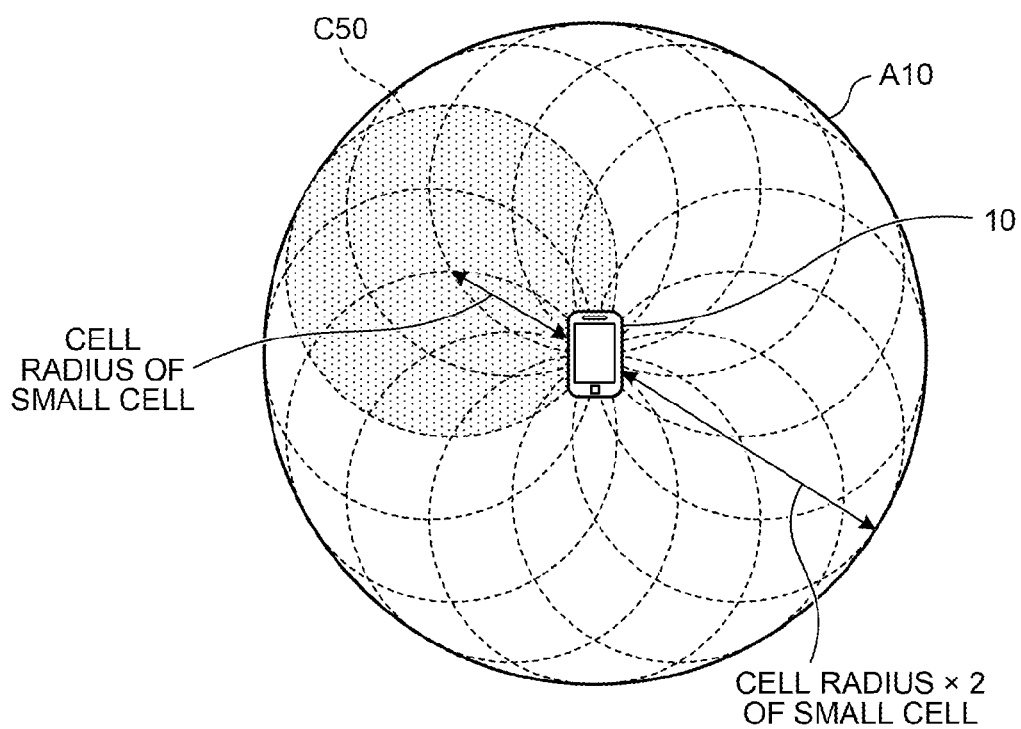
FIG. 8 is a diagram used for description of estimation of a peripheral area.

Therefore, for example, as illustrated in FIG. 8, the estimation unit 74 calculates, as the peripheral area, the area A10 within a circle having the average width of the small cell C50 as the diameter, using the position indicated by the position information of the terminal 10 as the center. That is, the peripheral area is an area estimated to include the small cell C50 in which the terminal 10 exists. FIG. 8 is a diagram used for description of the estimation of the peripheral area.

Processing of Identifying Terminal within Peripheral Area

The identification unit 73 then identifies the terminal 20 that exists in the estimated peripheral area.

That is, the control unit 72 acquires the position information of each terminal 20 reported from each terminal 20 that exists in the macro cell C30 through the base station 30 (that is, the macro cell C30). The identification unit 73 then identifies all of the terminals 20 that exist in the estimated peripheral area based on the estimated peripheral area and the position information of each terminal 20.

The notification unit 75 then forms a control signal to the terminals 20 identified in the identification unit 73, and notifies the terminals 20 identified in the identification unit 73 of the formed control signal through the network IF 71 and the base station 30. The control signal is the control signal that starts the cell search processing about the small cell C50, as described above.

Cell Search Processing about Small Cell

In the terminal 20, the cell search unit 26 starts the cell search about the small cell C50 when the above-described control signal is included a signal transmitted using the macro cell C30.

Figure 9:
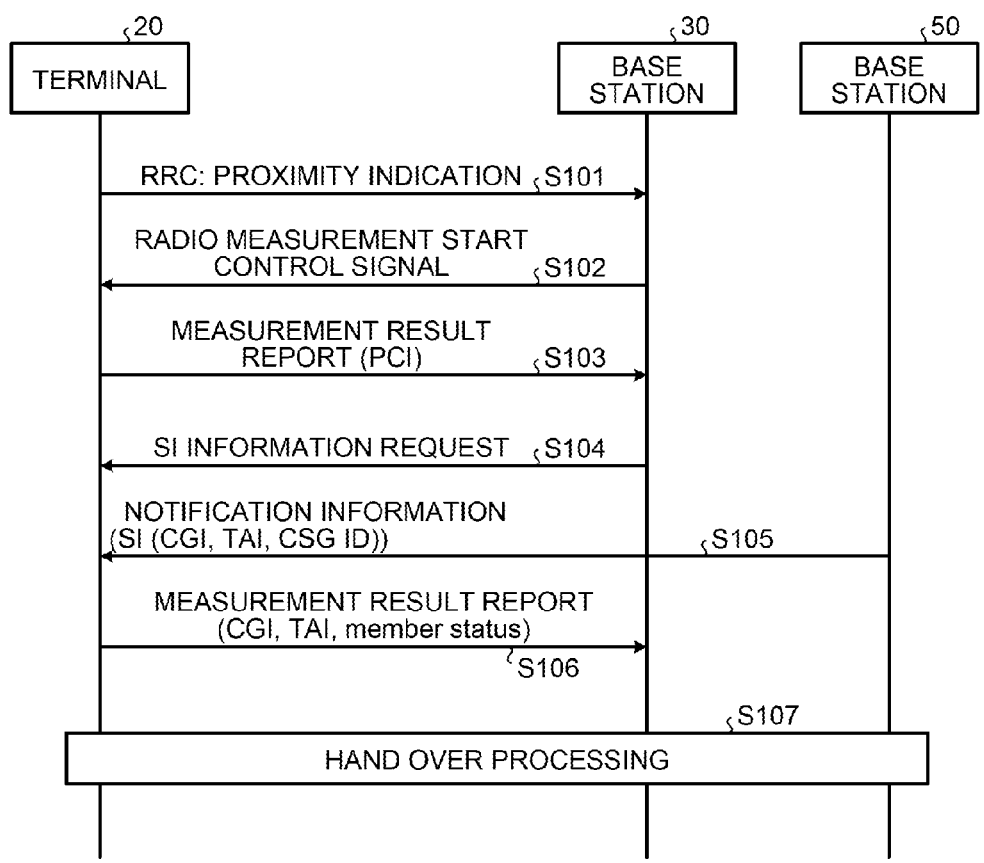
FIG. 9 is a diagram used for description of cell search processing about a small cell.

For example, when the above-described control signal is included in the signal transmitted using the macro cell C30, the cell search unit 26 executes a procedure illustrated in FIG. 9. FIG. 9 indicates a procedure from when the terminal 20 transmits a radio resource control (RRC) signal to the base station 30 being connected, to when the RRC signal is handed over from the base station 30 to the base station 50. In the procedure, the cell search processing about the small cell C50 by the terminal 20 is included. FIG. 9 is a diagram used for description of the cell search processing about a small cell.

First, the cell search unit 26 transmits proximity indication to the base station 30 being connected as a radio resource control (RRC) signal when the above-described control signal is included in the signal transmitted using the macro cell C30 (step S101). Accordingly, the base station 30 can get to know the terminal 20 that has transmitted the proximity indication exists in the peripheral area.

When having received the proximity indication transmitted from the terminal 20, the control unit 33, in the base station 30, transmits a radio measurement start control signal to the terminal 20 (step S102). The radio measurement start control signal includes control information used for measurement of the small cell C50. When having received the radio measurement start control signal, the cell search unit 26, in the terminal 20, executes the cell search processing about the small cell C50. The cell search unit 26 can identify a physical cell ID (PCI) of the small cell C50 by the cell search processing.

The cell search unit 26 then includes the identified PCI (that is, a candidate of a handover destination base station) in a measurement report result, and transmits the measurement result report to the base station 30 (step S103).

The control unit 33, in the base station 30, then transmits a system information (SI) request that requests a report of SI of the small cell C50 to the terminal 20 (step S104).

When having received the SI information request, the cell search unit 26, in the terminal 20, then receives, in the small cell C50, notification information transmitted from the base station 50 (step S105), and extracts the SI included in the received notification information. In the extracted SI, a cell global identity (CGI), a tracking area identity (TAI), and a closed subscriber group identification (CSG ID) are included. The cell search unit 26 then determines whether the terminal 20 itself belongs to the CSG indicated by the CSG ID based on the extracted SI.

The cell search unit 26 then transmits a measurement result report including the CGI and the TAI included in the extracted SI, and information (that is, a member status) indicating whether the terminal 20 belongs to the CSG to the base station 30 (step S106).

The base station 30 then determines whether handing over the terminal 20, and when having determined to hand over the terminal 20, the base station 30 executes handover processing between the terminal 20 and the base station 50 (step S107).

As described above, according to the present embodiment, the network IF 71, in the control apparatus 70, acquires the position information of the terminal 10 that exists in both of the macro cell C30 and the small cell C50, and the position information of the terminal 20 that exists in the macro cell C30. The control unit 72 then identifies the terminal 20 that exists in the peripheral area including an area corresponding to the small cell C50 based on the position information of the terminal 10 and the position information of the terminal 20. The control unit 72 then notifies the identified terminal 20 of the control signal that starts the cell search about the small cell C50 through the macro cell C30.

With the configuration of the control apparatus 70, the control apparatus 70 can allow only the terminal 20 positioned in the vicinity of the small cell C50 to start the cell search. Therefore, the power consumption of the terminal 20 can be reduced.

Further, the control unit 72 estimates the peripheral area based on the position information of the terminal 10 and the value corresponding to the width of the area corresponding to the small cell C50, and identifies the second terminal that exists in the estimated peripheral area based on the estimated peripheral area and the position information of the second terminal.

With the configuration of the control apparatus 70, the peripheral area including the area corresponding to the small cell C50 can be simply calculated.

[b] Second Embodiment

In the first embodiment, the control apparatus is supposed not to acquire the information of the base station corresponding to the small cell. In contrast, in a second embodiment, a control apparatus is supposed to acquire information of a base station corresponding to a small cell. Note that, in the second embodiment, an administrator of the control apparatus is supposed to know the information of the base station corresponding to the small cell, and a first terminal is supposed to be installed in the vicinity of the base station.

Outline of Communication System

Figure 10:
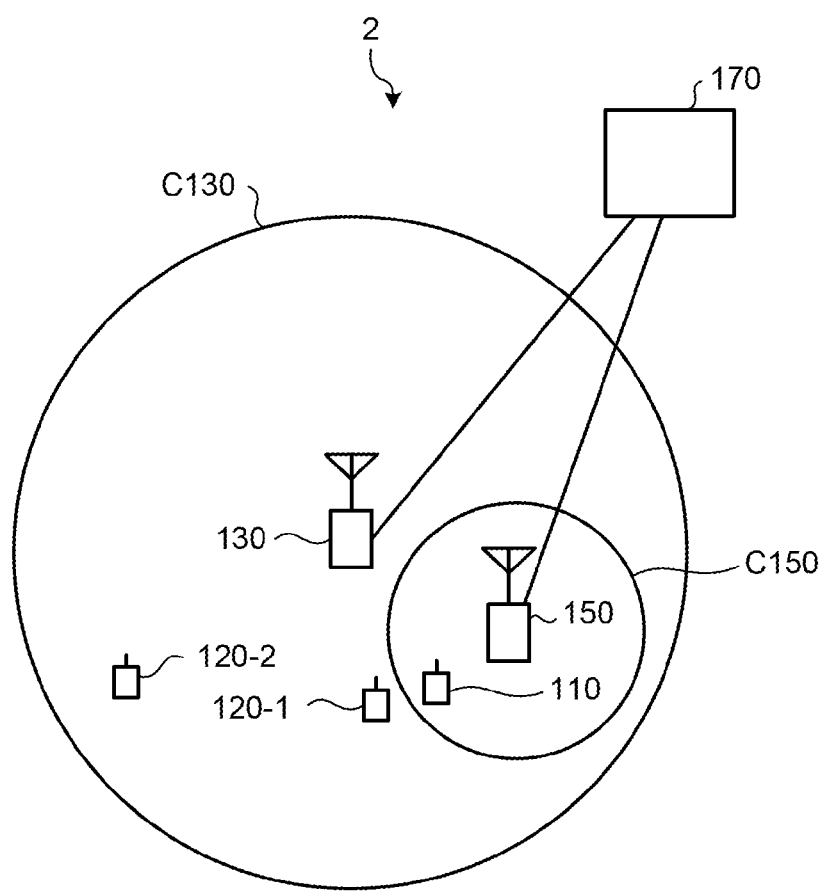
FIG. 10 is a diagram illustrating an example of a communication system of a second embodiment.

FIG. 10 is a diagram illustrating an example of a communication system of the second embodiment. In FIG. 10, a communication system 2 includes terminals 110 and 120, base stations 130 and 150, and a control apparatus 170. The terminals 110 and 120 respectively correspond to the terminals 10 and 20 of the first embodiment. The base stations 130 and 150 respectively correspond to the base stations 30 and 50 of the first embodiment. The control apparatus 170 corresponds to the control apparatus 70 of the first embodiment. Further, a macro cell C130 corresponds to the macro cell C30 of the first embodiment. A small cell C150 corresponds to the small cell C50 of the first embodiment.

Configuration Example of Control Apparatus

Figure 11:
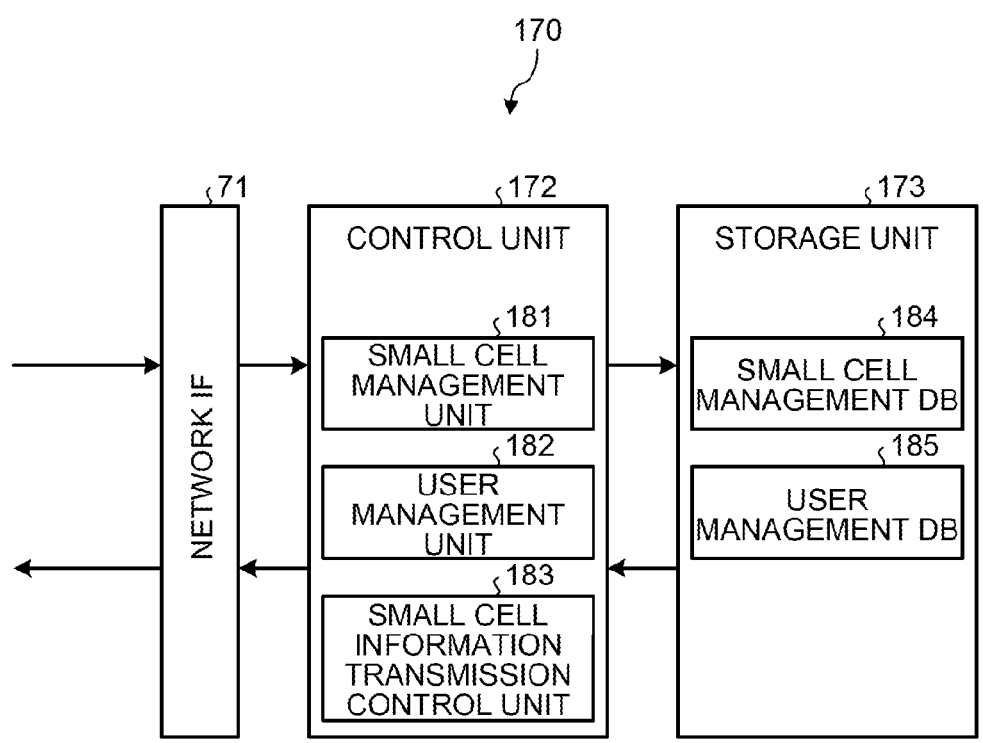
FIG. 11 is a block diagram illustrating an example of a control apparatus of the second embodiment.

FIG. 11 is a block diagram illustrating an example of a control apparatus of the second embodiment. In FIG. 11, the control apparatus 170 includes a control unit 172 and a storage unit 173. The control unit 172 includes a small cell management unit 181, a user management unit 182, and a small cell information transmission control unit 183. The storage unit 173 includes a small cell management database (DB) 184 and a user management DB 185.

The small cell management unit 181 manages information (frequency information, position information, and the like) related to the small cell C150 that exists in an area corresponding to the macro cell C130. For example, the small cell management unit 181 causes the small cell management DB 184 to store the information related to the small cell C150 subjected to registration processing by the base station 150 corresponding to the small cell C150. Further, the small cell management unit 181 periodically transmits an operation continuation confirmation signal to the base station 150 corresponding to the small cell C150 registered in the small cell management DB 184. When a response to the operation continuation confirmation signal is not transmitted from the base station 150, the small cell management unit 181 determines the small cell C150 is not currently being operated, and deletes the information related to the small cell C150 from the small cell management DB 184.

The user management unit 182 manages information (that is, user information (a terminal identifier, position information, and the like)) related to the terminals 110 and 120 that exist in an area corresponding to the macro cell C130. For example, the user management unit 182 causes the user management DB 185 to store the user information subjected to registration processing by the terminals 110 and 120. Further, the user management unit 182 updates the position information already stored in the user management DB 185 with latest position information periodically transmitted from the terminals 110 and 120.

The small cell information transmission control unit 183 transmits small cell information to the terminal 120 that exists in the peripheral area in response to a small cell information transmission request transmitted from the terminal 110. For example, the small cell information transmission control unit 183 receives the small cell information transmission request transmitted from the terminal 110. The small cell information transmission request includes identification information of a small cell. The small cell information transmission control unit 183 then searches the small cell management DB 184 using the identification information of the small cell as a key. Then, when the identification information of the small cell is registered in the small cell management DB 184, the small cell information transmission control unit 183 identifies, in the user management DB 185, a terminal 120 associated with the identification information of the small cell, that is, a terminal 120 that is a transmission source of the small cell information transmission request. The small cell information transmission control unit 183 then estimates a peripheral area based on the position information associated with the identified terminal 120 in the user management DB 185, and a predetermined value, and identifies the terminal 120 that exists in the estimated peripheral area. The small cell information transmission control unit 183 then transmits the small cell information to all of the identified terminals 120.

The small cell management DB 184 stores the information related to the small cell C150 received from the small cell management unit 181.

The user management DB 185 stores the user information received from the user management unit 182.

Configuration Example of First Terminal

Figure 12:
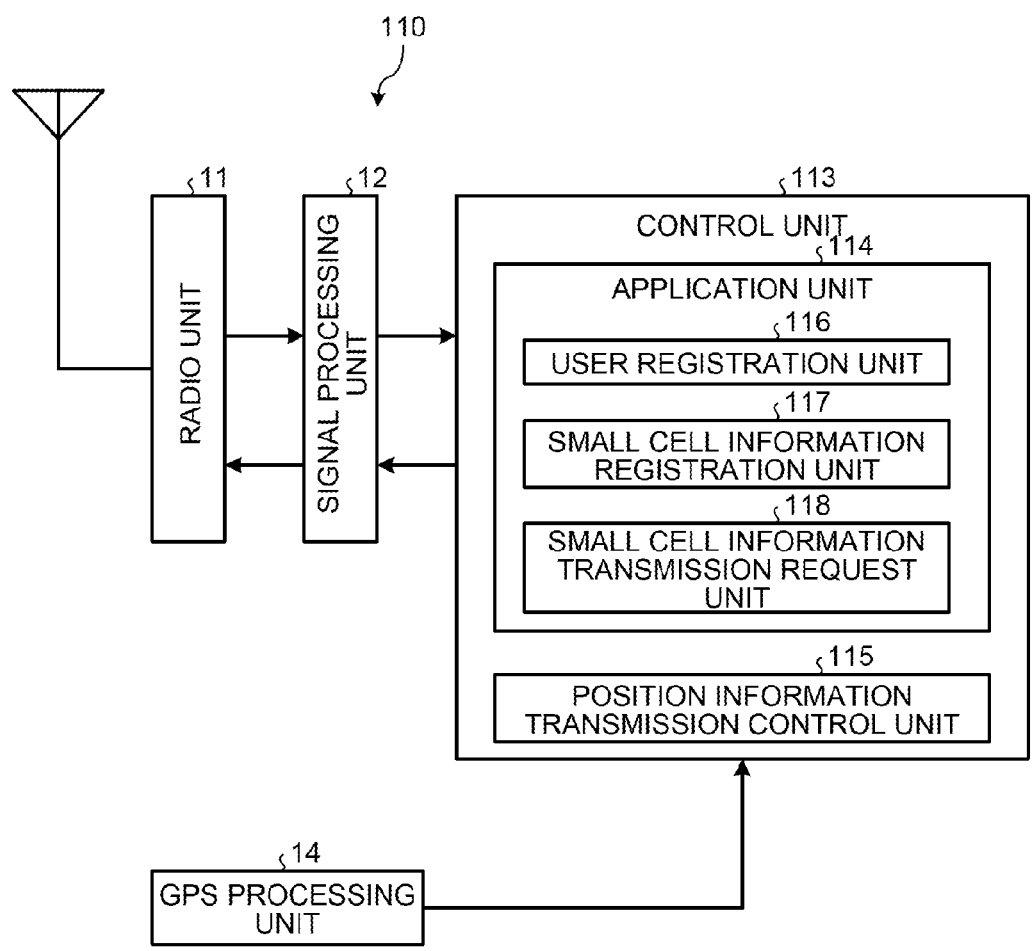
FIG. 12 is a block diagram illustrating an example of a first terminal of the second embodiment.

FIG. 12 is a block diagram illustrating an example of a first terminal of the second embodiment. In FIG. 12, the terminal 110 includes a control unit 113. The control unit 113 includes an application unit 114 and a position information transmission control unit 115. The application unit 114 includes a user registration unit 116, a small cell information registration unit 117, and a small cell information transmission request unit 118.

The user registration unit 116 transmits user information of the own terminal to the control apparatus 170 through the base station 130.

The small cell information registration unit 117 transmits, to the control apparatus 170 through the base station 130, the information (frequency information, position information, and the like) related to the small cell C150 in which the own terminal exists.

The small cell information transmission request unit 118 periodically transmits the small cell information transmission request to the control apparatus 170 through the base station 130.

The position information transmission control unit 115 transmits the position information of the own terminal received from the GPS processing unit 14 to the control apparatus 170 through the base station 130.

Configuration Example of Second Terminal

Figure 13:
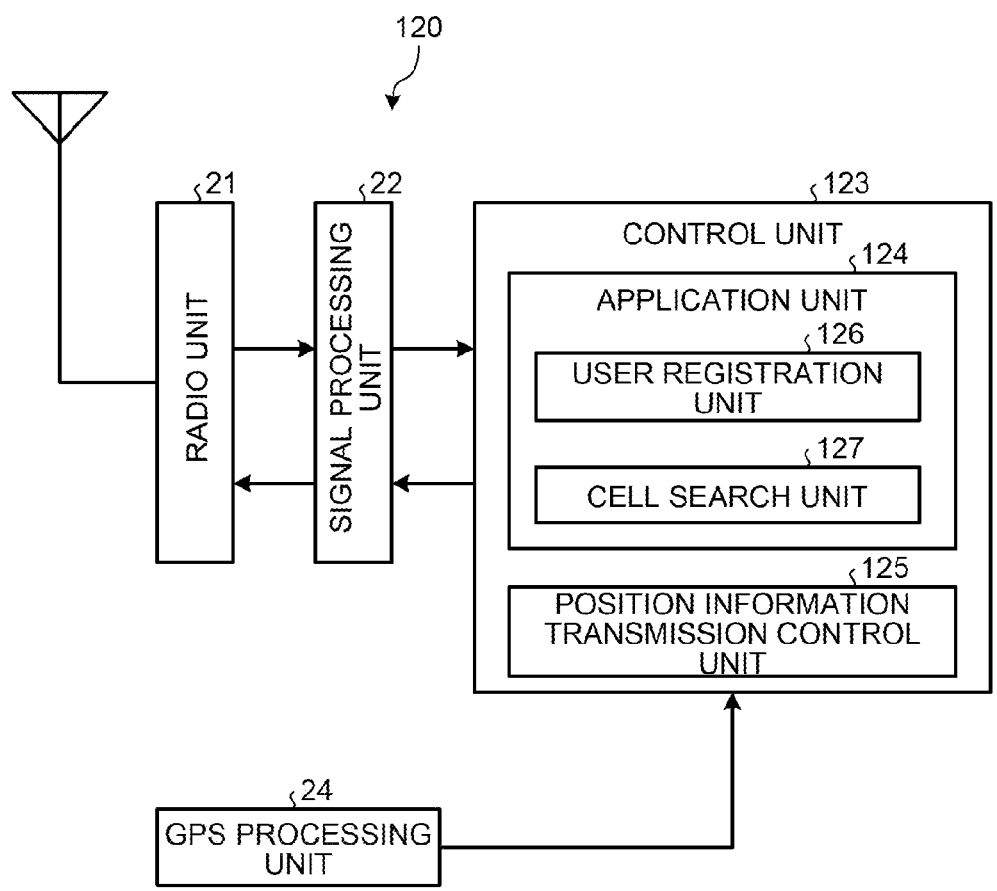
FIG. 13 is a block diagram illustrating an example of a second terminal of the second embodiment.

FIG. 13 is a block diagram illustrating an example of a second terminal of the second embodiment. In FIG. 13, the terminal 120 includes a control unit 123. The control unit 123 includes an application unit 124 and a position information transmission control unit 125. The application unit 124 includes a user registration unit 126 and a cell search unit 127.

The user registration unit 126 transmits user information of the own terminal to the control apparatus 170 through the base station 130.

The cell search unit 127 starts the cell search about the small cell C150 when the small cell information is included in a signal transmitted using the macro cell C130. That is, the small cell information corresponds to the control information of the first embodiment.

The position information transmission control unit 125 transmits the position information of the own terminal received from the GPS processing unit 24 to the control apparatus 170 through the base station 130.

Configuration Example of First Base Station

Figure 14:
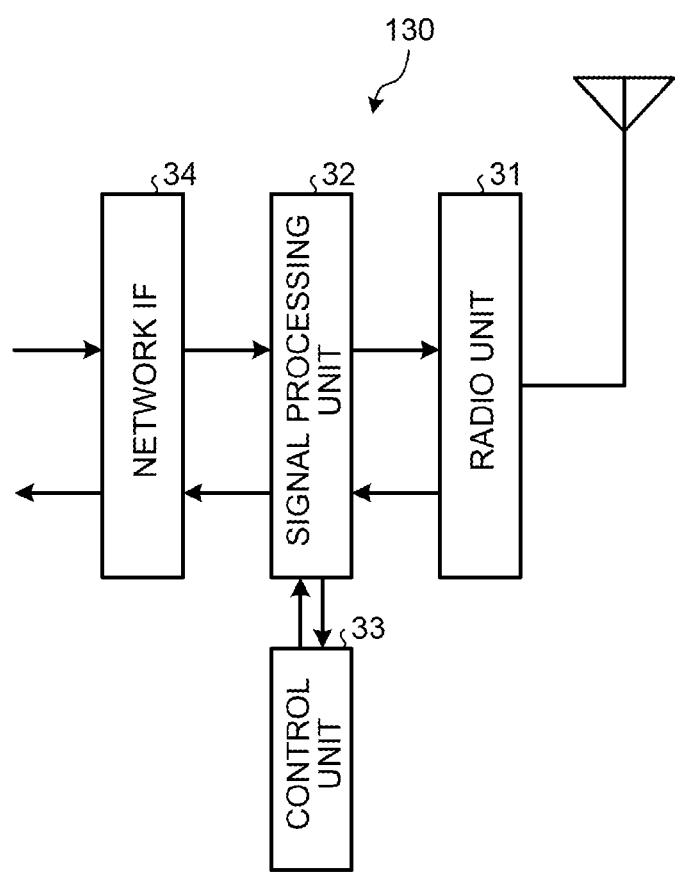
FIG. 14 is a block diagram illustrating an example of a first base station of the second embodiment.

FIG. 14 is a block diagram illustrating an example of a first base station of the second embodiment. As illustrated in FIG. 14, the base station 130 basically includes the same configuration as the base station 30 of the first embodiment. However, communication partners are the control apparatus 170 and the terminals 110 and 120.

Configuration Example of Second Base Station

Figure 15:
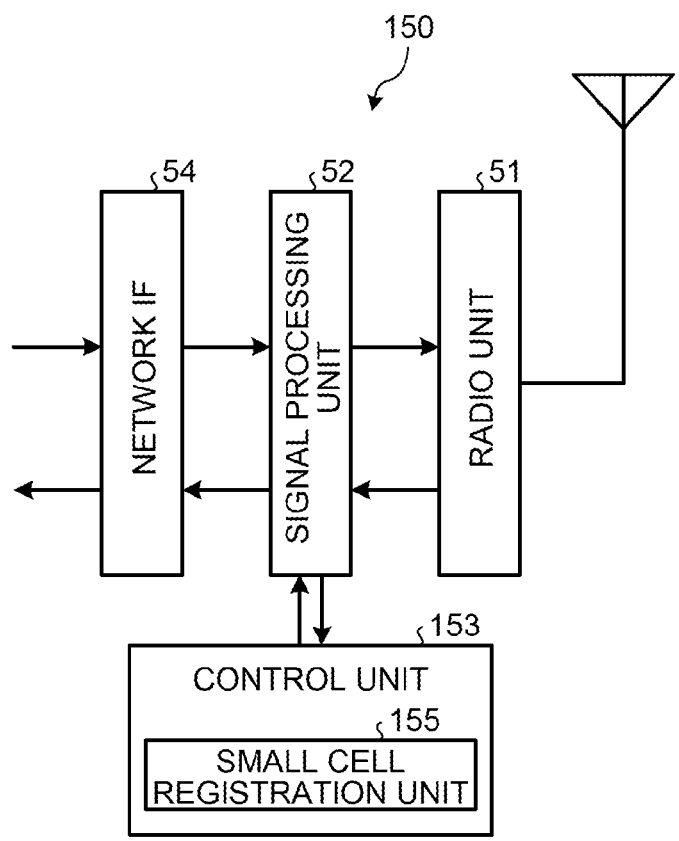
FIG. 15 is a block diagram illustrating an example of a second base station of the second embodiment.

FIG. 15 is a block diagram illustrating an example of a second base station of the second embodiment. In FIG. 15, the base station 150 includes a control unit 153. The control unit 153 includes a small cell registration unit 155.

The small cell registration unit 155 transmits information (frequency information, position information, and the like) of the own station to the control apparatus 170. Further, when having received an operation continuation confirmation request periodically transmitted from the control apparatus 170, the small cell registration unit 155 transmits a response signal if the own station is being in operation. The response signal may include information (frequency information, position information, and the like) of the base station 150.

Operation Example of Communication System

An example of a processing operation in the communication system 2 having the above configurations will be described.

Registration of Small Cell Information to Control Apparatus

Figures 16, 17:
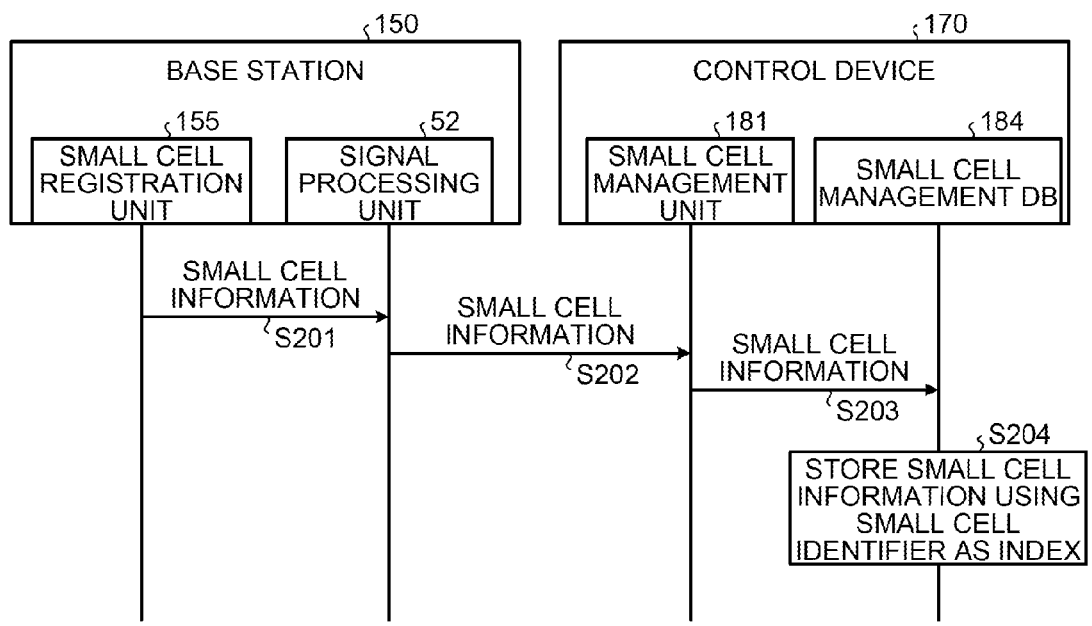
FIG. 16 is a sequence diagram used for description of registration of small cell information of the second embodiment.
FIG. 17 is a diagram illustrating an example of the small cell information.

FIG. 16 is a sequence diagram used for description of registration of small cell information of the second embodiment.

In the base station 150, the small cell registration unit 155 sends the information of the own station, that is, the small cell information to the signal processing unit 52 (step S201).

The signal processing unit 52 transmits a transmission signal including the small cell information received from the small cell registration unit 155 to the control apparatus 170 through the network IF 71 (step S202).

When having received the signal including the small cell information from the base station 150, the small cell management unit 181, in the control apparatus 170, sends the small cell information to the small cell management DB 184 (step S203).

The small cell management DB 184 stores the small cell information received from the small cell management unit 181 using a small cell identifier included in the small cell information as an index (step S204).

Here, the small cell information will be described. FIG. 17 is a diagram illustrating an example of the small cell information. As illustrated in FIG. 17, the small cell information includes a small cell identifier, position information, a frequency band, a cell radius, a guest user, and a user ID as items. The small cell identifier is an identifier unique to each small cell. Further, the item of the guest user indicates whether permitting the guest user to access the small cell. That is, when the guest user is permitted to access the small cell, all of the users can access the small cell, and therefore, the item of the user ID is disabled.

Figure 18:
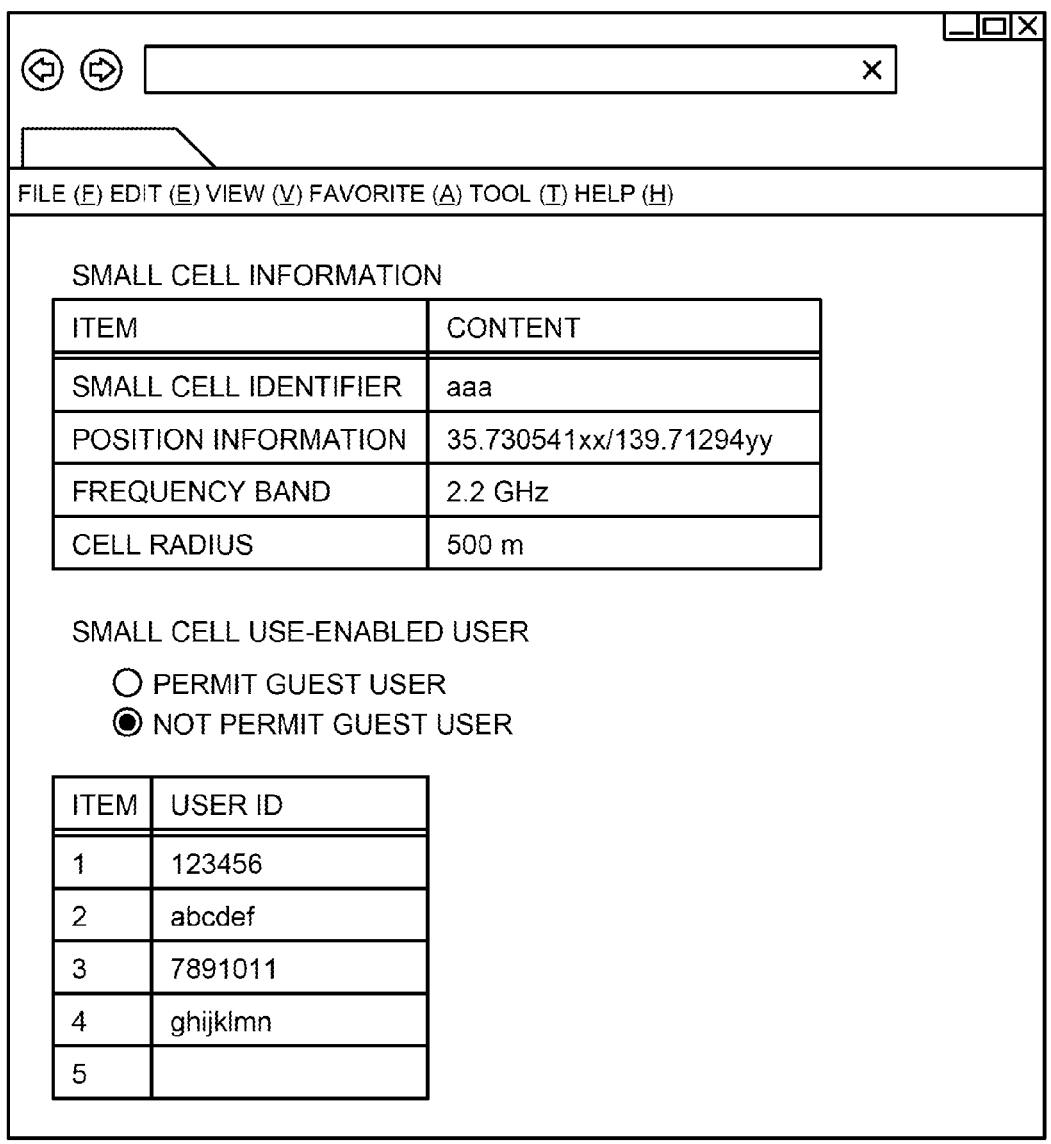
FIG. 18 is a diagram illustrating an example of an input screen of a small cell.

The small cell registration unit 155 may acquire the small cell information by an input of the user. A web browser may be used to acquire the small cell information. That is, the small cell registration unit 155 includes a management page of the web browser, and the user accesses the management page using a communication apparatus. The user then inputs the small cell information on the management page displayed in a display unit of the communication apparatus. FIG. 18 is a diagram illustrating an example of an input screen of the small cell. In FIG. 18, the small cell identifier, the position information, the frequency band, and the cell radius are basic information, and therefore, those items may be forbidden to be changed. Further, on the input screen illustrated in FIG. 18, setting of permission/non-permission of the access by the guest user can be executed using a radio button. When the access of the guest user is not permitted, the input screen illustrated in FIG. 18 includes an input frame through which an ID of the user, an access of which is to be permitted is input. The small cell registration unit 155 sends the small cell information input by the user using the input screen to the signal processing unit 52.

A format of the small cell management DB 184 will be described. FIG. 19 is a diagram illustrating an example of a format of the small cell management DB. As illustrated in FIG. 19, the small cell management DB 184 holds the small cell information for each small cell C150 that exists in an area corresponding to the macro cell C130. Note that, when having already stored the small cell information corresponding to the small cell identifier included in the small cell information received this time, the small cell management DB 184 performs update processing with the content of the small cell information received this time.

Management of Small Cell Information

Figure 20:
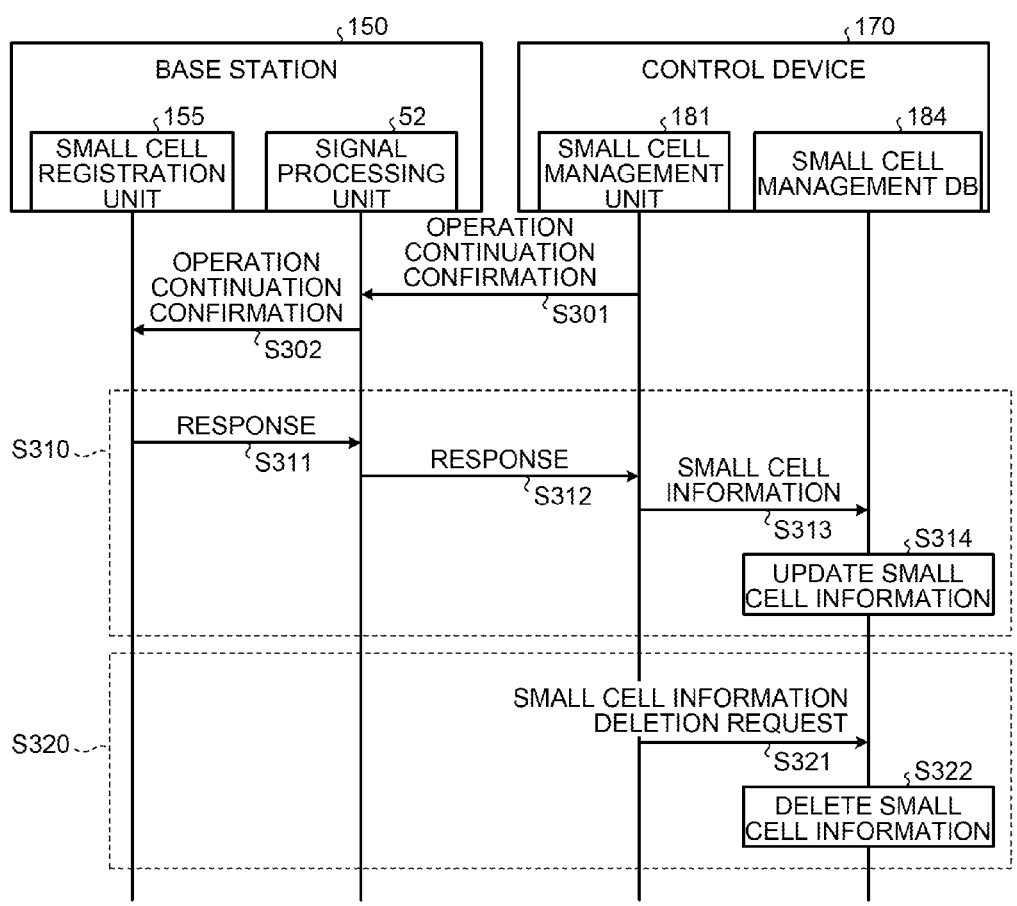
FIG. 20 is a diagram used for description of management of small cell information of the second embodiment.

FIG. 20 is a diagram used for description of management of the small cell information of the second embodiment.

In the control apparatus 170, the small cell management unit 181 transmits an operation continuation confirmation to the base station 150 (step S301).

When having received the operation continuation confirmation transmitted from the control apparatus 170, the signal processing unit 52, in the base station 150, sends the operation continuation confirmation to the small cell registration unit 155 (step S302).

When having received the operation continuation confirmation, the small cell registration unit 155 determines whether the own station is being in operation, and sends a response to the signal processing unit 52 when being in operation (step S311). That is, when the base station 150 is being in operation, the procedure of step S310 is executed. Here, the small cell registration unit 155 sends the response including the current small cell information.

The signal processing unit 52 transmits the response received from the small cell registration unit 155 to the control apparatus 170 (step S312).

When having received the response transmitted from the base station 150, the small cell management unit 181, in the control apparatus 170, sends the small cell information included in the response to the small cell management DB 184 (step S313).

When having received the small cell information from the small cell management unit 181, the small cell management DB 184 updates the already registered small cell information with the small cell information (step S314).

Meanwhile, the small cell registration unit 155, in the base station 150, does not send a response when the own station is not in operation. That is, when the base station 150 is not in operation, the procedure of step S320 is executed. For example, in the control apparatus 170, the small cell management unit 181 sends a small cell information deletion request to the small cell management DB 184 when a response has not been returned for a given time after transmitting the operation continuation confirmation (step S321).

When having received the small cell information deletion request, the small cell management DB 184 deletes the small cell information corresponding to the small cell information deletion request (step S322).

Registration of User Information

Figure 21:
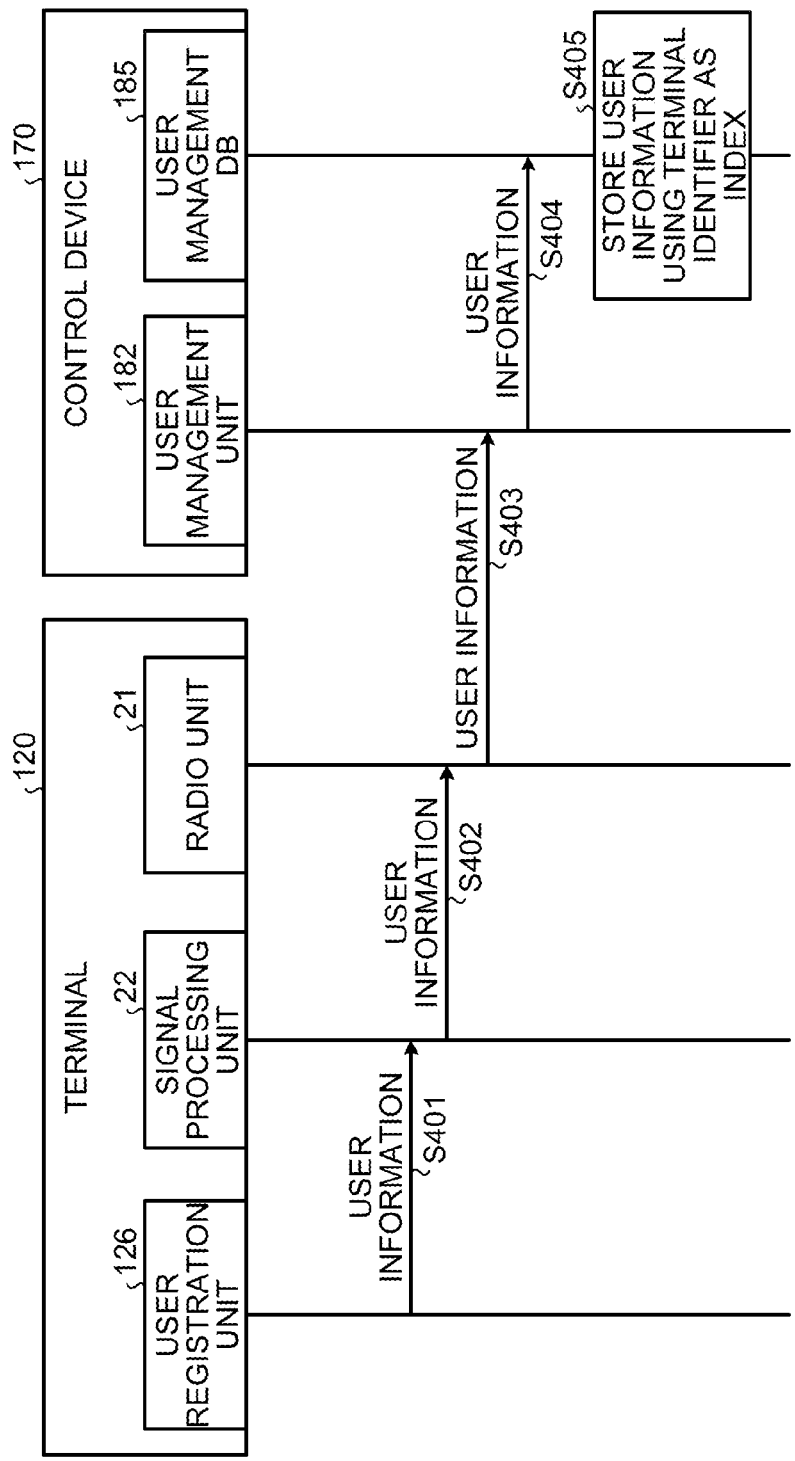
FIG. 21 is a diagram used for description of registration of user information of the second embodiment.

FIG. 21 is a diagram used for description of registration of user information of the second embodiment.

In the terminal 120, the user registration unit 126 sends the user information to the signal processing unit 22 (step S401). For example, the user information includes a terminal identifier, a user ID, and a password.

The signal processing unit 22 sends a transmission signal including the user information received from the user registration unit 126 to the radio unit 21 (step S402).

The radio unit 21 applies radio processing to the signal including the user information received from the signal processing unit 22, and transmits an obtained radio signal to the control apparatus 170 through the base station 130 (step S403). Note that, in FIG. 21, description of the base station 130 is omitted.

When having received the signal including the user information from the terminal 120, the user management unit 182, in the control apparatus 170, sends the user information to the user management DB 185 (step S404).

The user management DB 185 stores the user information received from the user management unit 182 using the terminal identifier included in the user information as an index (step S405).

Figures 22, 23:
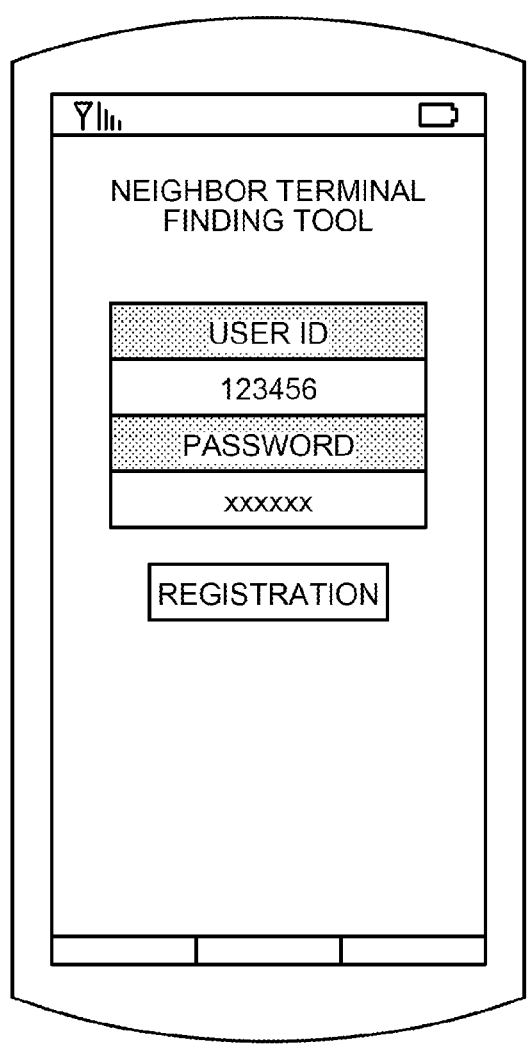
FIG. 22 is a diagram illustrating an example of user information of the second terminal.
FIG. 23 is a diagram illustrating an example of an input screen of the user information.

Here, the user information of the terminal 120 will be described. FIG. 22 is a diagram illustrating an example of the user information of the second terminal. As illustrated in FIG. 22, the user information of the terminal 120 includes a terminal identifier, a user ID, and a password as items.

Further, the user registration unit 126 may cause an input screen of the user information to be displayed in a display unit (not illustrated) of the terminal 120, and send the user information input by the user using the input screen to the signal processing unit 22. FIG. 23 is a diagram illustrating an example of the input screen of the user information. Note that the terminal identifier is information unique to the terminal 120, and is already stored by the terminal 120, and thus, an input frame of the terminal identifier is not provided on the input screen.

Figures 24, 25:
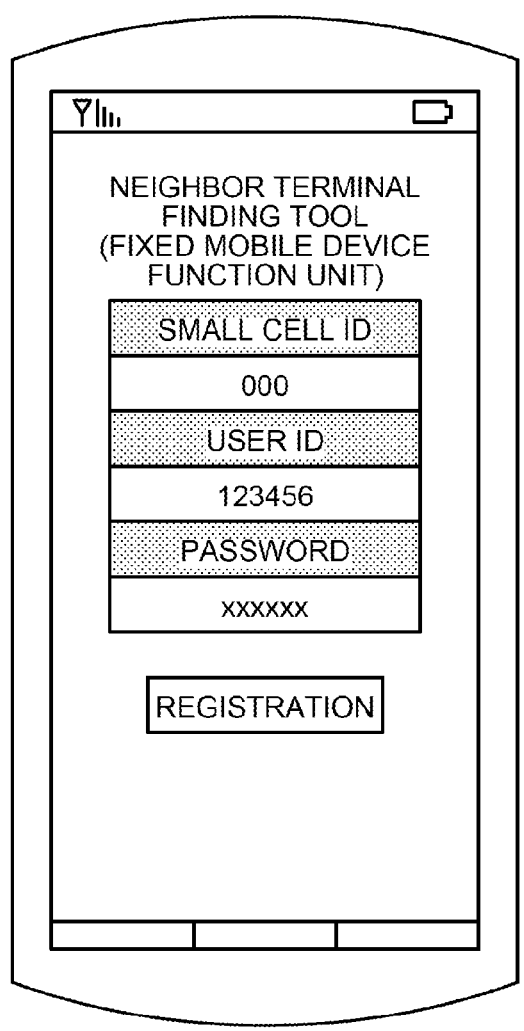
FIG. 24 is a diagram illustrating an example of user information of the first terminal.
FIG. 25 is a diagram illustrating an example of an input screen of the user information.

Note that the terminal 110 performs registration of the user information similarly to the terminal 120. However, the user information transmitted from the terminal 110 to the control apparatus 170 includes, as illustrated in FIG. 24, a small cell ID as an item, in addition to the terminal identifier, the user ID, and the password. FIG. 24 is a diagram illustrating an example of the user information of the first terminal.

Further, in the terminal 110, the user registration unit 116 may cause an input screen of the user information to be displayed in a display unit (not illustrated) of the terminal 110, and send the user information input by the user using the input screen to the signal processing unit 12. FIG. 25 is a diagram illustrating an example of the input screen of the user information.

As described above, the user management DB 185 stores the user information transmitted from the terminal 110 and the terminal 120. FIG. 26 is a diagram illustrating an example of a format of the user management DB. As illustrated in FIG. 26, the user management DB 185 holds the user information of each of the terminal 110 and the terminal 120. The user information held in the user management DB 185 includes a terminal type as an item. The terminal type is information that distinguishes the terminal 110 and the terminal 120. That is, in the second embodiment, the terminal 110 is supposed to be fixedly installed in the vicinity of the base station 150 corresponding to the small cell C150 by an administrator. Therefore, information of "fixed" is set to the item of the terminal type of the user information to the terminal 110. Further, the user information to the terminal 110 is associated with a small cell ID (that is, a small cell identifier). Meanwhile, information of "common" is set to the item of the terminal type of the user information to the terminal 120. Note that the format of the user management DB illustrated in FIG. 26 is not a completed form, and the format becomes the completed format when the position information described below is set.

Registration of Position Information

Figure 27:
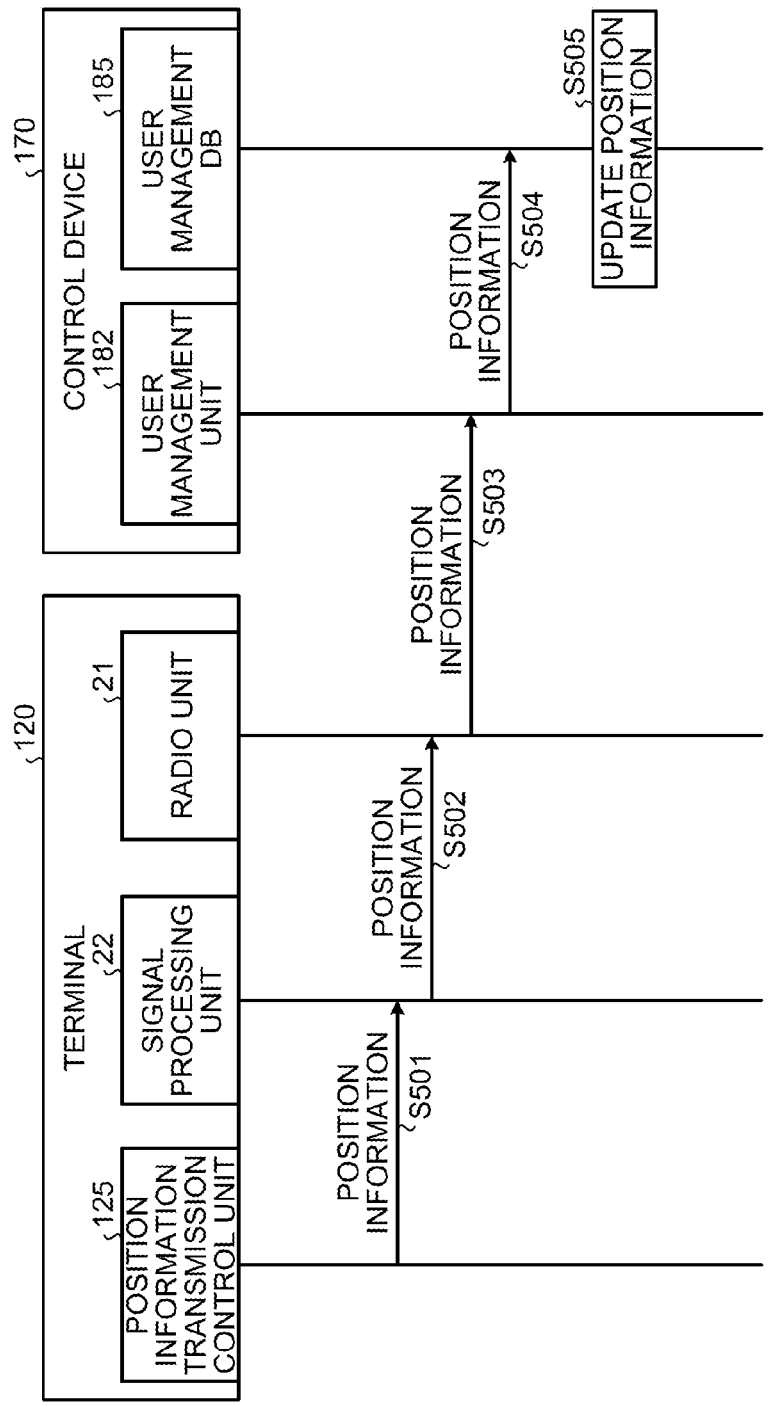
FIG. 27 is a diagram used for description of registration of position information of the second embodiment.

FIG. 27 is a diagram used for description of registration of the position information of the second embodiment.

In the terminal 120, the position information transmission control unit 125 sends the current position information of the terminal 120 to the signal processing unit 22 (step S501). For example, the position information includes information related to a latitude and a longitude, and the terminal identifier.

The signal processing unit 22 sends a transmission signal including the position information received from the position information transmission control unit 125 to the radio unit 21 (step S502).

The radio unit 21 applies radio processing to a signal including the position information received from the signal processing unit 22, and transmits an obtained radio signal to the control apparatus 170 through the base station 130 (step S503). Note that, in FIG. 27, description of the base station 130 is omitted.

When having received the signal including the position information from the terminal 120, the user management unit 182, in the control apparatus 170, sends the position information to the user management DB 185 (step S504).

The user management DB 185 stores the position information received from the user management unit 182 using the terminal identifier included in the position information as an index (step S505).

Note that the terminal 110 performs registration of the user information similarly to the terminal 120.

As described above, the user management DB 185 stores the position information transmitted from the terminal 110 and the terminal 120. FIG. 28 is a diagram illustrating an example of a format of the user management DB. As illustrated in FIG. 28, the position information is associated with each of the terminal 110 and the terminal 120. Further, an update time of the position information is associated with each of the terminal 110 and the terminal 120.

Note that, in the above description, an example of a case in which the user information and the position information are separately transmitted from the terminal 110 and the terminal 120 to the control apparatus 170 has been described. However, the embodiment is not limited to the example. For example, the user information and the position information may be transmitted together.

Transmission Request of Small Cell Information

Figure 29:
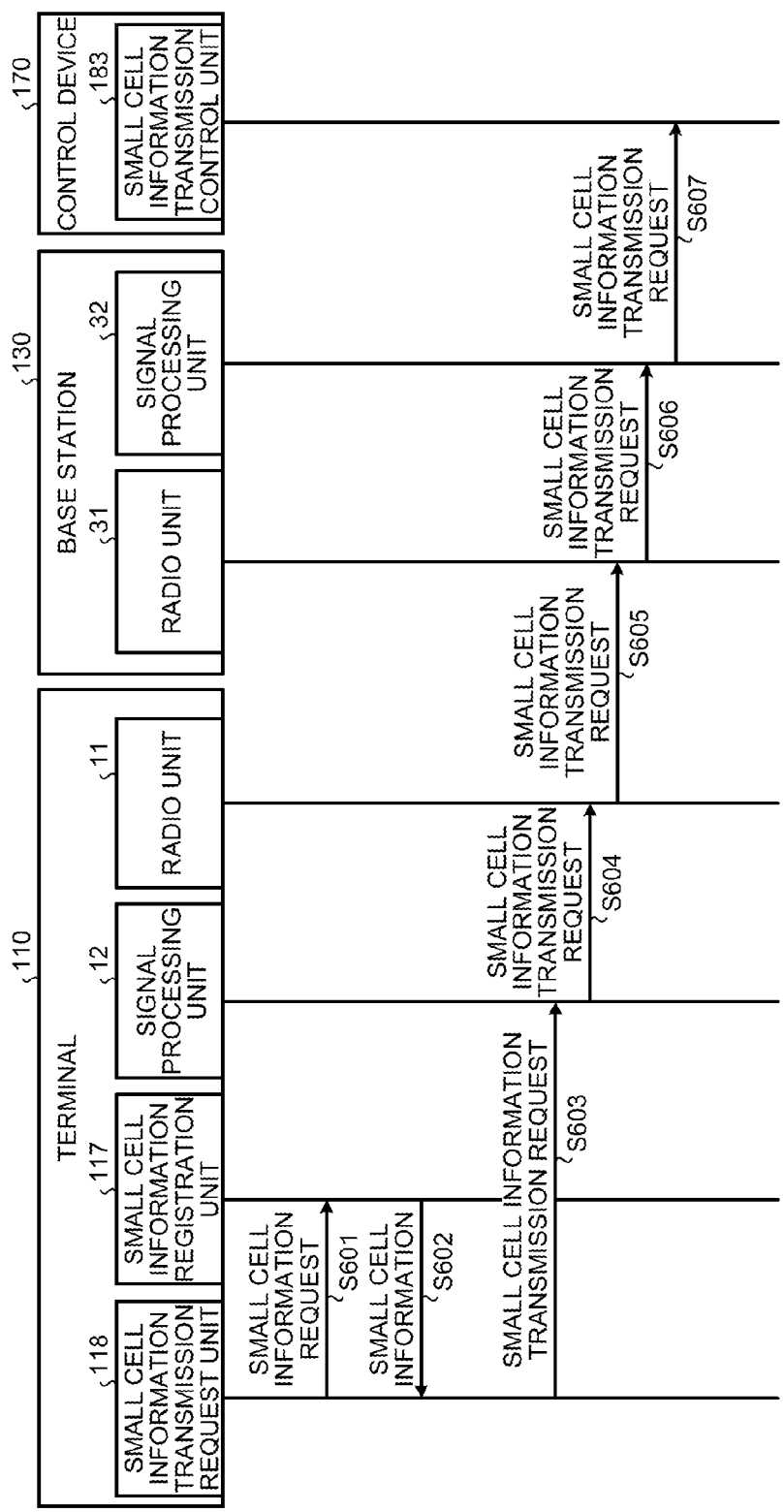
FIG. 29 is a diagram used for description of a transmission request of the small cell information of the second embodiment.

FIG. 29 is a diagram used for description of a transmission request of the small cell information of the second embodiment.

In the terminal 110, the small cell information transmission request unit 118 holds the identifier of the small cell C150 corresponding to the base station 150, of which the terminal 110 is installed in the vicinity. FIG. 30 is a diagram illustrating an example of a holding form of the small cell identifier by the small cell information transmission request unit. Further, the small cell information registration unit 117 holds the small cell information of the small cell C150 corresponding to the base station 150, of which the terminal 110 is installed in the vicinity.

The small cell information transmission request unit 118 sends a small cell information request to the small cell information registration unit 117 (step S601). The small cell information request includes the small cell identifier.

When having received the small cell information request from the small cell information transmission request unit 118, the small cell information registration unit 117 sends the small cell information held by the own terminal to the small cell information transmission request unit 118 (step S602).

Figure 32:
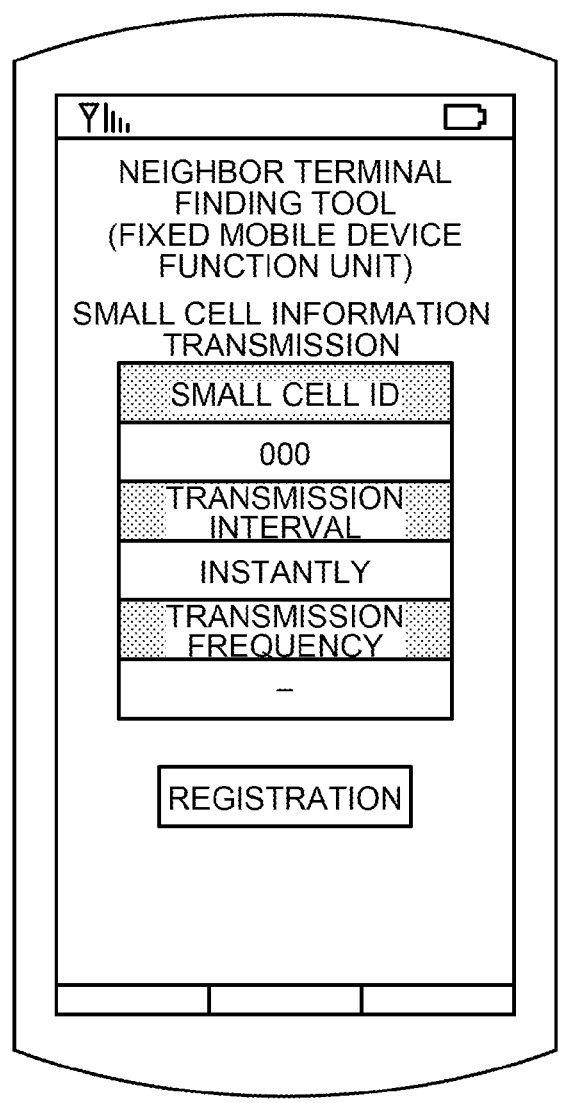
FIG. 32 is a diagram illustrating an example of an input screen of a transmission interval and a transmission frequency.

When having received the small cell information from the small cell information registration unit 117, the small cell information transmission request unit 118 forms a small cell information transmission request using the small cell information, and sends the request to the signal processing unit 12 (step S603). FIG. 31 is a diagram illustrating an example of a format of the small cell information transmission request. An item of a transmission interval indicates a time interval at which the control apparatus 170 transmits the small cell information to an appropriate terminal 120. Further, an item of a transmission frequency indicates the number of times with which the control apparatus 170 transmits the small cell information to the terminal 120. Further, the small cell information transmission request unit 118 may cause an input screen of the transmission interval and the transmission frequency to be displayed in the display unit (not illustrated) of the terminal 110, and include the transmission interval and the transmission frequency input by the user using the input screen in the small cell information transmission request. FIG. 32 is a diagram illustrating an example of the input screen of the transmission interval and the transmission frequency.

Referring back to FIG. 29, the signal processing unit 12 sends a transmission signal including the small cell information transmission request received from the small cell information transmission request unit 118 to the radio unit 11 (step S604).

The radio unit 11 applies radio processing to the signal including the small cell information transmission request received from the signal processing unit 12, and transmits an obtained radio signal to the base station 130 (step S605).

In the base station 130, the radio unit 31 receives the signal including the small cell information transmission request from the terminal 110, applies predetermined radio reception processing to the signal, and sends the signal to the signal processing unit 32 (step S606).

When having received the signal including the small cell information transmission request from the radio unit 31, the signal processing unit 32 transmits the signal to the control apparatus 170 (step S607).

Transmission of Small Cell Information

Figure 33:
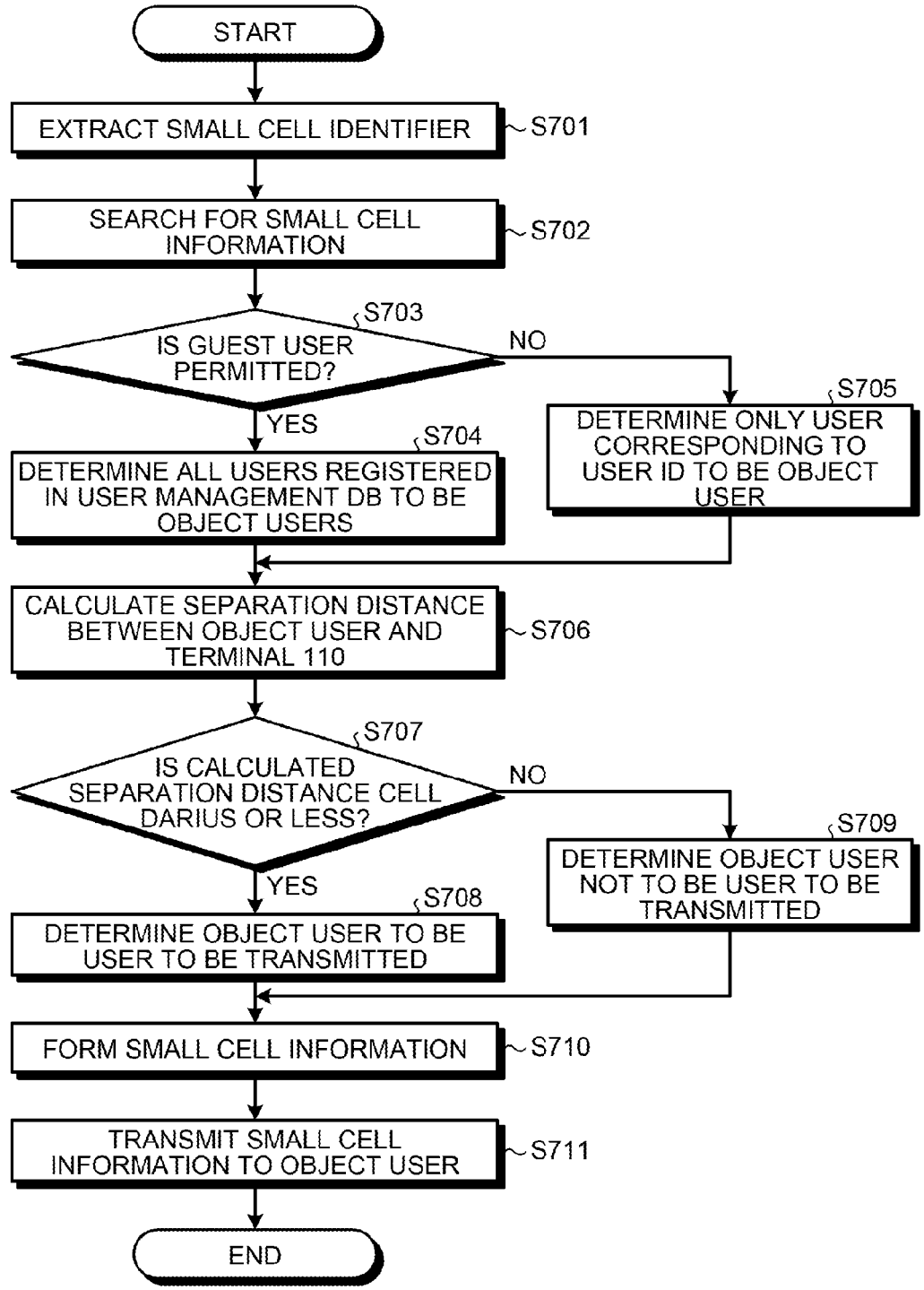
FIG. 33 is a flowchart used for description of a transmission procedure of the small cell information.
Figures 34, 35:
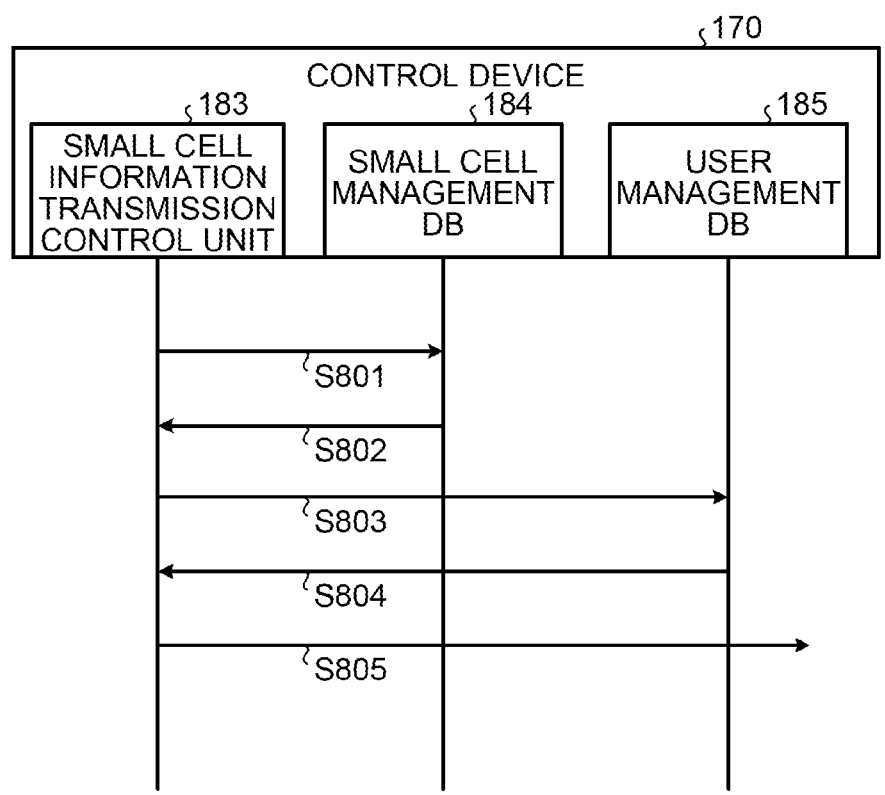
FIG. 34 is a flowchart used for description of a transmission procedure of the small cell information of the second embodiment.
FIG. 35 is a sequence diagram illustrating transmission/reception of information among function units in the control apparatus in the transmission procedure of the small cell information of the second embodiment.

When having received the small cell information transmission request transmitted from the terminal 110, the control apparatus 170 executes a transmission procedure of the small cell information. FIG. 33 is a flowchart used for description of the transmission procedure of the small cell information of the second embodiment. FIG. 34 is a sequence diagram illustrating transmission/reception of information among function units in the control apparatus in the transmission procedure of the small cell information of the second embodiment.

In the control apparatus 170, the small cell information transmission control unit 183 extracts the small cell identifier from the small cell information transmission request transmitted from the terminal 110 (step S701). The small cell information transmission control unit 183 then searches for the small cell information (step S702). That is, the small cell information transmission control unit 183 sends a small cell information request including the extracted small cell identifier to the small cell management DB 184 (step S801). The small cell management DB 184 then sends the small cell information corresponding to the small cell identifier included in the small cell information request received from the small cell information transmission control unit 183 to the small cell information transmission control unit 183 (step S802).

When having received the small cell information from the small cell management DB 184, the small cell information transmission control unit 183 determines whether the small cell corresponding to the small cell information permits the guest user (step S703).

When having determined that the small cell permits the guest user (affirmed in step S703), the small cell information transmission control unit 183 then determines all of the users registered in the user management DB 185 to be object users (step S704). Meanwhile, when having determined that the small cell does not permit the guest user (denied in step S703), the small cell information transmission control unit 183 determines only a user corresponding to the user ID included in the small cell information received from the small cell management DB 184 to be the object user (step S705). The small cell information transmission control unit 183 then sends an acquisition request of the user information about the object users determined in step S704 or S705 to the user management DB 185 (step S803). The user management DB 185 sends the user information about the object users indicated by the acquisition request to the small cell information transmission control unit 183 (step S804).

When having received the user information corresponding to the object users, the small cell information transmission control unit 183 then repeats the processing of steps S706 to S709 about each of the object users. That is, the small cell information transmission control unit 183 calculates a separation distance between one object user and the terminal 110 (step S706). The small cell information transmission control unit 183 then determines whether the calculated separation distance is a cell radius or less (step S707). The cell radius used here is a cell radius of the small cell C150 corresponding to the base station 150, of which the terminal 110 is installed in the vicinity. When the calculated separation distance is the cell radius or less (affirmed in step S707), the small cell information transmission control unit 183 then determines the one object user to be a user to be transmitted (step S708). Meanwhile, when the calculated separation distance is larger than the cell radius (denied in step S707), the small cell information transmission control unit 183 determines the one object user not to be the user to be transmitted (step S709).

The small cell information transmission control unit 183 then forms small cell information to be returned to the terminal 120 that is the user to be transmitted (step S710).

The small cell information transmission control unit 183 then transmits the formed small cell information to the terminal 120 that is the user to be transmitted (steps S711 and S805). FIG. 35 is a diagram illustrating an example of a format of the small cell information sent to the user to be transmitted.

Each terminal 120 that has received the small cell information then executes the procedure illustrated in FIG. 9, for example.

As described above, according to the present embodiment, the network IF 71, in the control apparatus 170, acquires the position information of the terminal 110 that exists in both of the macro cell C130 and the small cell C150, and the position information of the terminal 120 that exists in the macro cell C130. The control unit 172 then identifies the terminal 120 that exits in the peripheral area including an area corresponding to the small cell C150 based on the position information of the terminal 110 and the position information of the terminal 120. The control unit 172 then notifies the identified terminal 120 of the control signal that starts the cell search about the small cell C150 through the macro cell C130.

With the configuration of the control apparatus 170, only the terminal 120 positioned in the vicinity of the small cell C150 can start the cell search, and therefore, the power consumption of the terminal 120 can be reduced.

[c] Other Embodiments

Each configuration element of each unit illustrated in the first and second embodiments is not necessarily physically configured like the illustration. That is, specific forms of distribution/integration of the units are not limited to the illustration, and a part or all of the forms can be functionally or physically distributed/integrated in arbitrary units according to various types of loads, a use status, and the like.

Further, all or any part of various processing functions performed in each apparatus may be executed on a central processing unit (CPU) (or on a microcomputer such as a micro processing unit (MPU) or a micro controller unit (MCU)). Further, all or any part of the various processing functions may be executed on a program analyzed and executed by a CPU (or a microcomputer such as an MPU or an MCU) or hardware by a wired logic.

The terminals, the base stations, and the control apparatuses of the first and second embodiments can be realized by a following hardware configuration, for example.

Figure 36:
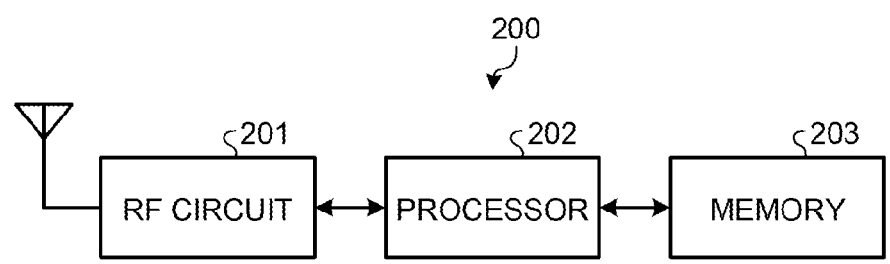
FIG. 36 is a diagram illustrating a hardware configuration example of a terminal.

FIG. 36 is a diagram illustrating a hardware configuration example of a terminal. As illustrated in FIG. 36, a terminal 200 includes a radio frequency (RF) circuit 201, a processor 202, and a memory 203.

Examples of the processor 202 include a central processing unit (CPU), a digital signal processor (DSP), a field programmable gate array (FPGA), and the like. Further, examples of the memory 203 include a random access memory (RAM) such as a synchronous dynamic random access memory (SDRAM), a read only memory (ROM), a flash memory, and the like. Note that, in the case of the first embodiment, each of the terminal 10 and the terminal 20 has the hardware configuration as illustrated in FIG. 36, and in the case of the second embodiment, each of the terminal 110 and the terminal 120 has the hardware configuration as illustrated in FIG. 36.

The various processing functions performed in the terminals of the first and second embodiments may be realized such that programs stored in various memories such as a nonvolatile storage medium are executed by a processor provided in an amplifier. That is, programs corresponding to the processing executed by the signal processing units 12 and 22, the control units 13, 23, 113, and 123, and the GPS processing units 14 and 24 are recorded in the memory 203, and each program may be executed by the processor 202. Further, the processing executed by the signal processing units 12 and 22, the control units 13, 23, 113, and 123, and the GPS processing units 14 and 24 may be shared and executed by a plurality of processors such as a base band CPU and an application CPU. Further, the radio units 11 and 21 are realized by the RF circuit 201.

Figure 37:
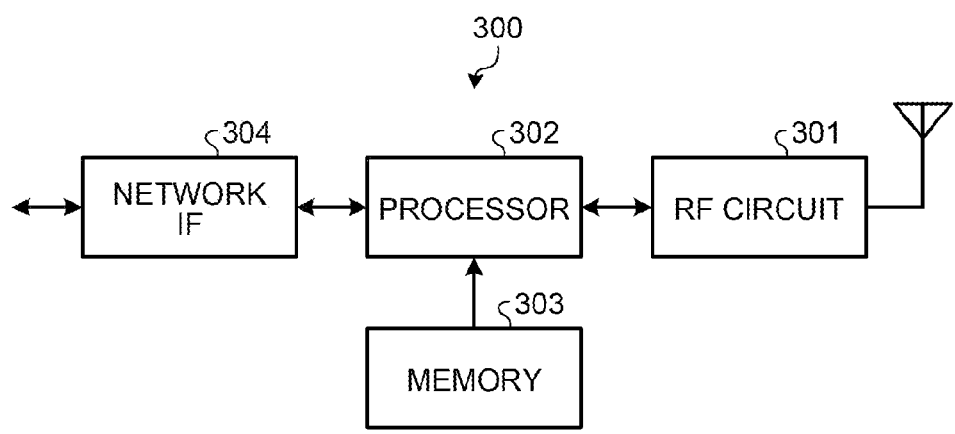
FIG. 37 is a diagram illustrating a hardware configuration example of a base station.

FIG. 37 is a diagram illustrating a hardware configuration example of a base station. As illustrated in FIG. 37, a base station 300 includes an RF circuit 301, a processor 302, a memory 303, and a network interface (IF) 304. Examples of the processor 302 include a CPU, a DSP, an FPGA, and the like. Further, examples of the memory 303 include a RAM such as an SDRAM, a ROM, a flash memory, and the like. Note that, in the case of the first embodiment, each of the base station 30 and the base station 50 has the hardware configuration as illustrated in FIG. 37, and in the case of the second embodiment, each of the base station 130 and the base station 150 has the hardware configuration as illustrated in FIG. 37.

The various processing functions performed in the base stations of the first and second embodiments may be realized such that programs stored in various memories such as a non-volatile storage medium are executed by a processor provided in an amplifier. That is, programs corresponding to the processing executed by the signal processing units 32 and 52, and the control units 33, 53, and 153 may be recorded in the memory 303, and each program may be executed by the processor 302. Further, the network IFs 34 and 54 are realized by the network IF 304. Further, the radio units 31 and 51 are realized by an RF circuit 301.

Note that, here, the base station 300 has been described as an integrated apparatus. However, the base station 300 is not limited thereto. For example, the base station 300 may be configured from two separate apparatuses of a radio apparatus and a base station control apparatus. In this case, for example, the RF circuit 301 is disposed in the radio apparatus, and the processor 302, the memory 303, and the network IF 304 are disposed in the base station control apparatus.

Figure 38:
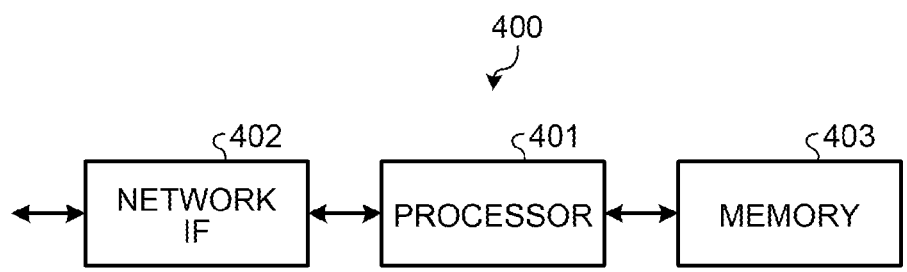
FIG. 38 is a diagram illustrating a hardware configuration example of a control apparatus.

FIG. 38 is a diagram illustrating a hardware configuration example of a control apparatus. As illustrated in FIG. 38, a network apparatus 400 includes a processor 401, a network IF 402, and a memory 403. Examples of the processor 401 include a CPU, a DSP, an FPGA, and the like. Further, examples of the memory 403 include a RAM such as an SDRAM, a ROM, a flash memory, and the like.

The various processing functions performed in the control apparatuses of the first and second embodiments may be realized such that programs stored in various memories such as a non-volatile storage medium are executed by a processor provided in an amplifier. That is, programs corresponding to the processing executed by the control units 72 and 172 are recorded in the memory 403, and each program may be executed by the processor 401. Further, the network IF 71 is realized by the network IF 402. Further, the storage unit 173 corresponds to the memory 403.

According to an aspect of the disclosure, the power consumption of a terminal apparatus can be reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control apparatus comprising:
    an acquisition unit configured to acquire position information of a first terminal that exists in both of a first cell and a second cell, and position information of a second terminal that exists in the first cell; and
    a control unit configured to identify the second terminal that exists in a peripheral area including an area corresponding to the second cell based on the position information of the first terminal and the position information of the second terminal, and notify the identified second terminal of a control signal that starts cell search about the second cell through the first cell, wherein
    the control unit estimates the peripheral area based on the position information of the first terminal and a value corresponding to a width of the area corresponding to the second cell, and identifies the second terminal that exists in the estimated peripheral area based on the estimated peripheral area and the position information of the second terminal.

2. The control apparatus according to claim 1, wherein the control unit notifies the identified second terminal of the control signal when having received a request from the first terminal.

3. A method of controlling cell search, the method comprising:
    acquiring position information of a first terminal that exists in both of a first cell and a second cell, and position information of a second terminal that exists in the first cell;
    identifying the second terminal that exists in a peripheral area including an area corresponding to the second cell based on the position information of the first terminal and the position information of the second terminal; and
    causing the identified second terminal to start cell search about the second cell, wherein
    the identifying includes estimating the peripheral area based on the position information of the first terminal and a value corresponding to a width of the area corresponding to the second cell, and identifying the second terminal that exists in the estimated peripheral area based on the estimated peripheral area and the position information of the second terminal.

\* \* \* \* \*